(12) United States Patent
Shimizu

(10) Patent No.: US 6,914,943 B2
(45) Date of Patent: Jul. 5, 2005

(54) SIGNAL MODULATION CIRCUIT AND SIGNAL MODULATION METHOD

(75) Inventor: Hiroaki Shimizu, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 507 days.

(21) Appl. No.: 09/964,758

(22) Filed: Sep. 28, 2001

(65) Prior Publication Data

US 2002/0031191 A1 Mar. 14, 2002

Related U.S. Application Data

(63) Continuation of application No. PCT/JP00/02124, filed on Mar. 31, 2000.

(30) Foreign Application Priority Data

Mar. 31, 1999 (JP) .......................................... 11-091717

(51) Int. Cl.[7] .............................................. H03C 3/00

(52) U.S. Cl. ........................ 375/302; 330/129; 330/2; 330/133; 330/279; 330/286; 455/108; 332/103

(58) Field of Search ........................... 330/286, 129, 330/279, 133, 2, 149, 136; 332/103; 455/108, 127.2, 126; 375/302, 297, 295

(56) References Cited

U.S. PATENT DOCUMENTS

| | | | | |
|---|---|---|---|---|
| 5,291,150 A | * | 3/1994 | Saarnimo et al. ........... | 330/279 |
| 5,420,536 A | | 5/1995 | Faulkner et al. ............ | 330/149 |
| 5,420,541 A | * | 5/1995 | Upton et al. ................ | 330/286 |
| 5,432,473 A | * | 7/1995 | Mattila et al. .............. | 330/133 |
| 5,434,537 A | * | 7/1995 | Kukkonen .................... | 330/2 |
| 5,450,044 A | * | 9/1995 | Hulick ........................ | 332/103 |
| 5,625,322 A | * | 4/1997 | Gourgue et al. ............ | 330/129 |
| 5,745,526 A | | 4/1998 | Kumm et al. ............... | 375/297 |
| 6,377,784 B2 | * | 4/2002 | McCune ....................... | 455/108 |

FOREIGN PATENT DOCUMENTS

| | | |
|---|---|---|
| EP | 0431201 | 6/1991 |
| EP | 0 431 201 A1 | 6/1991 |
| JP | 3-171953 | 7/1991 |

(Continued)

OTHER PUBLICATIONS

Kohji Chiba, Toshio Nojima, and Shigeru Tomisato, "Linearized Saturation Amplifier with Bidirectional Control (LSA–BC) for Digital Mobile Radio," IEEE Global Telecommunications Conference & Exhibition, vol. 3, pp 1958–1962, Dec. 1990.

G. Irvine, S. Herzinger, R. Schmidt, D. Kubetzko, J. Fenk, "An Up–Conversion Loop Transmitter IC for Digital Mobile Telephones," IEEE International Solid–State Circuits Conference, pp 364–365, 465, Feb. 1998.

Supplementary European Search Report dated Mar. 20, 2003.

Irvine et al. "An Up–Conversion Loop Transmitter IC for Digital Mobile Telephones," Siemens Microelectronics/ 1998 IEEE International Solid–State Circuits Conference SP 23.1 pp 364–365.

(Continued)

Primary Examiner—Stephen Chin
Assistant Examiner—Sudhanshu C. Pathak
(74) Attorney, Agent, or Firm—Finnegan, Henderson, Farabow, Garrett & Dunner, LLP

(57) ABSTRACT

A phase signal is modulated in quadrature modulation by a quadrature modulator, and the frequency of this modulated phase signal is converted into carrier frequency by a frequency converter. An amplitude signal extracted from the modulating signal is delayed by a delay circuit, and an output gain signal designating the output average power gain is supplied to the output signal of the delay circuit. Synchronization of this frequency modulated phase signal and the amplitude signal delayed and added to the output gain signal allows to obtain an RF signal with little out of band undesired component even if the modulating signal contains amplitude variation. Therefore, the RF signal with little out of band undesired component is output even if the modulating signal contains amplitude variation.

23 Claims, 13 Drawing Sheets

FOREIGN PATENT DOCUMENTS

| | | |
|---|---|---|
| JP | 3-265333 | 11/1991 |
| JP | 5-347642 | 12/1993 |
| JP | 9-326835 | 12/1997 |
| JP | 2000-138723 | 5/2000 |
| WO | WO 95/16304 | 6/1991 |
| WO | WO 94/24759 | 10/1994 |
| WO | WO 00/31881 | 6/2000 |

OTHER PUBLICATIONS

Tham et al. "A 2.7V 900MHz/1.9GHz Dual–Band Transceiver IC for Digital Wireless Communication," Rockwell International/1998 IEEE Custom Integrated Circuits Conference. pp. 559–562.

Norris, M. H. "Transmitter Architectures," 1998 IEEE. pp. 1–6.

* cited by examiner

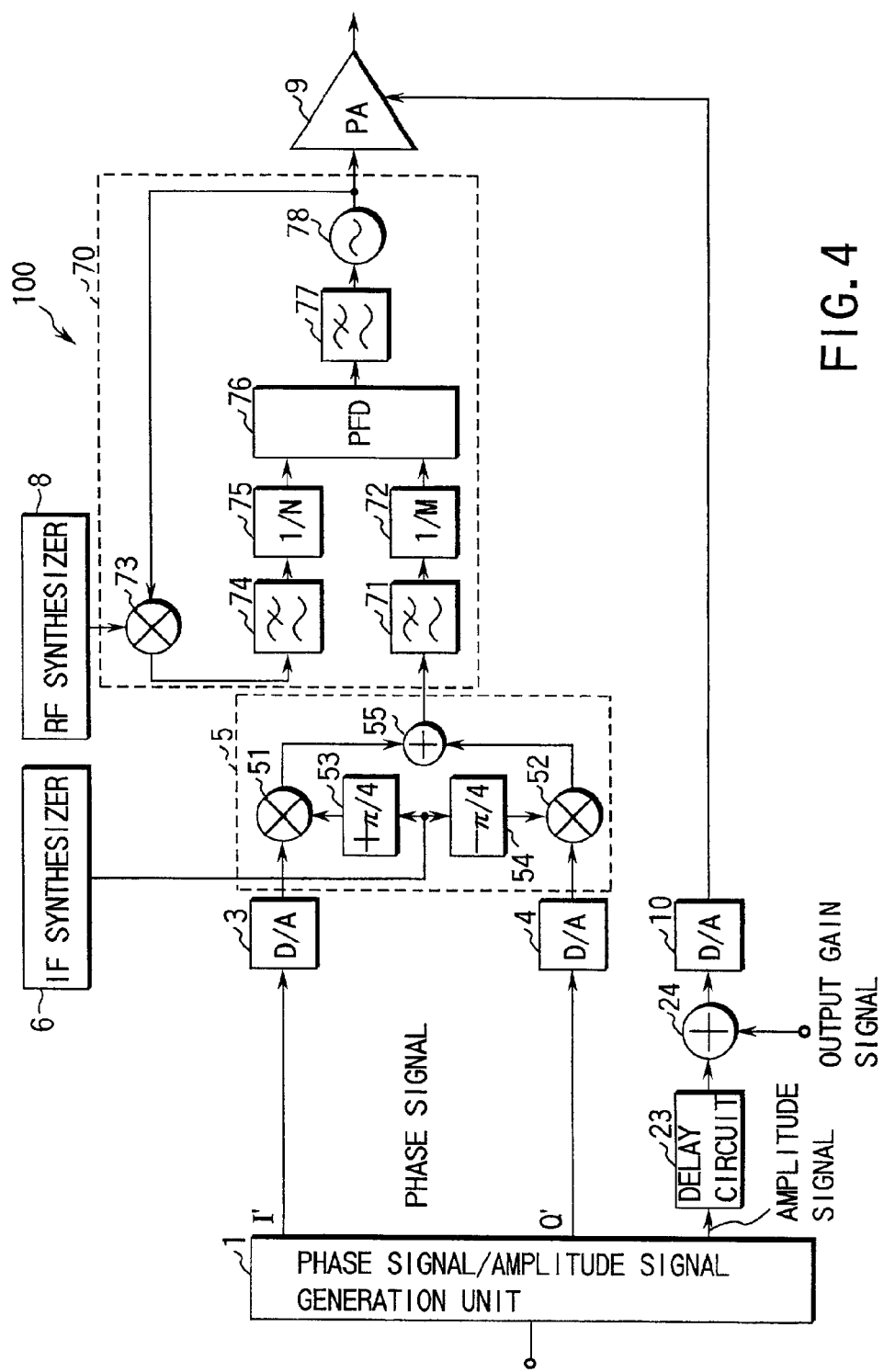

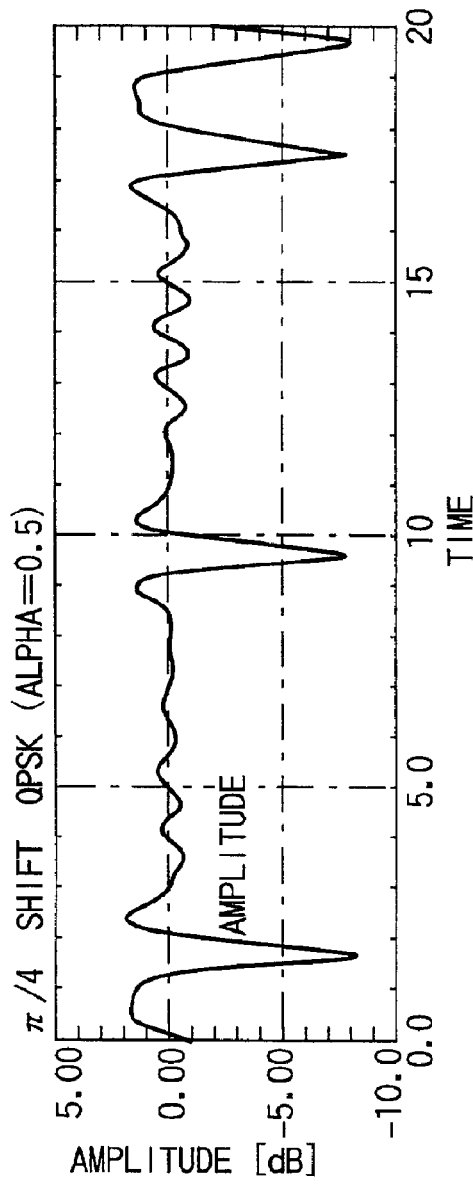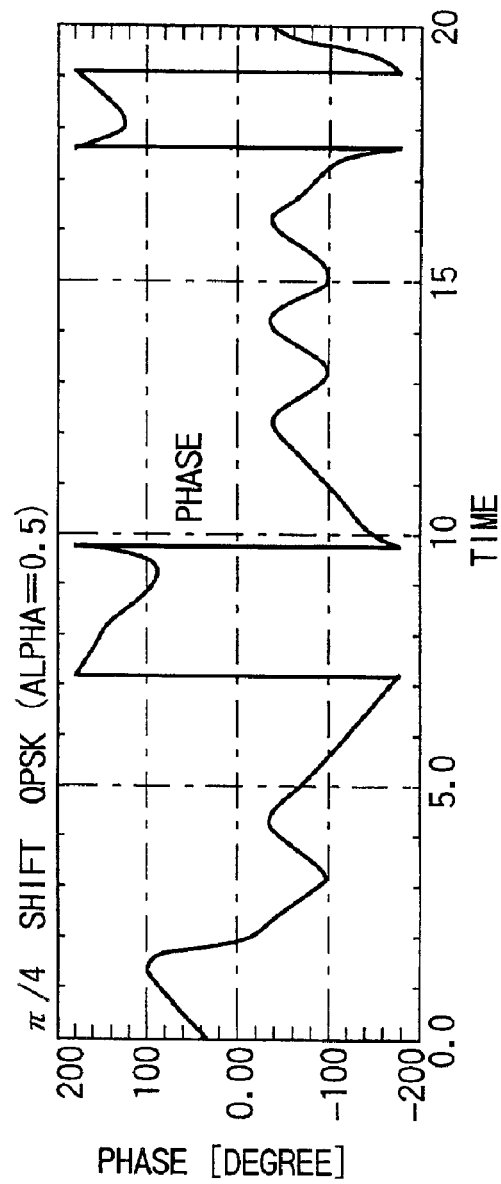
FIG. 9A
FIG. 9B

SIGNAL MODULATION CIRCUIT AND SIGNAL MODULATION METHOD

CROSS-REFERENCE TO RELATED APPLICATIONS

This is a Continuation Application of PCT Application No. PCT/JP00/02124, filed Mar. 31, 2000, which was not published under PCT Article 21(2) in English.

This application is based upon and claims the benefit of priority from the prior Japanese Patent Application No. 11-091717, filed Mar. 31, 1999, the entire contents of which are incorporated herein by reference.

BACKGROUND OF THE INVENTION

1. Field of the Invention

The present invention relates to a signal modulation circuit and a signal modulation method and, especially, a signal modulation circuit and a signal modulation method for modifying a signal based on a phase signal and an amplitude signal extracted from a modulating signal and, for example the signal modulation circuit and the signal modulation method for modifying a signal in the transmission unit of a cellular phone.

2. Description of the Related Art

Some of conventional signal modulation circuits and signal modulation methods are described in (1) "An Up-Conversion Loop Transmitter IC for Digital Mobile Telephones" (Siemens Microelectronics/1998 IEEE ISSCC SP 23.1), and (2) "A 2.7V 900 MHz/1.9 GHz DUAL-BAND TRANSCEIVER IC FOR DIGITAL WIRELESS COMMUNICATION" (Rockwell International/1998 IEEE CICC).

The modulation method described in the reference documents (1) and (2) may not apply to the modulation whose amplitude signal varies, since the method adopts a circuit for signal processing of sole phase signal only by phase synchronization loop.

In order to cope with a modulation form where the amplitude signal changes, for instance, $\pi/4$ shift QPSK ($\pi/4$ shift Quadrature Phase Shift Keying), it is necessary to adopt a construction as shown in FIG. 2 of the reference document (3) "Transmitter architectures [GSM hand set]" (1998 IEEE CDDCH). However, in this construction, modulated wave contains wave B as shown in FIG. 1 as out of band undesired component, since frequency of a modulating signal is converted without processing by the phase synchronization loop. It is necessary to use many voluminous and expensive filters to remove such out of band undesired component. There is a problem of increasing disadvantageously volume and cost of signal modulation system.

BRIEF SUMMARY OF THE INVENTION

The present invention has an object to provide a signal modulation circuit and a signal modulation method for obtaining a RF (radio frequency) signal with little out of band undesired component, even for modulating signal whose amplitude signal changes.

According to the present invention, there is provided:

a modulation circuit for obtaining a modulated signal, by modulating a carrier signal using a modulating signal, comprising:

means for extracting a phase signal and an amplitude signal from the modulating signal;

means for converting the phase signal into an analog signal;

first means for generating a first oscillation frequency signal;

means for modulating, in use of quadrature modulation, the analog signal output from the converting means to an IF signal, based on the first oscillation frequency signal;

second means for generating a second oscillation frequency signal, means for converting the frequency of the IF signal output from the modulating means and converting the IF signal into a RF signal, based on the second oscillation frequency signal;

means for delaying the amplitude signal output from the extracting means for a time; and means for varying the amplitude of the RF signal and amplifying the varied RF signal in accordance with the delayed amplitude signal output from the delaying means, and for outputting the amplified RF signal.

Further, according to the present invention, there is provided:

a modulation circuit for obtaining a modulated signal, by modulating a carrier signal using a modulating signal, comprising;

means for extracting a phase signal and an amplitude signal from the modulating signal;

means for digitally modulating, in use of quadrature modulation, the phase signal output from the extracting means to an IF signal;

means for converting the IF signal output from the modulating means into an analog IF signal;

means for converting the frequency of the analog IF signal output from the converting means and converting the analog IF signal into a RF signal;

means for delaying the amplitude signal output from the extracting means for a time; and means for varying the amplitude of the RF signal and amplifying the varied RF signal in accordance with the delayed amplitude signal output from the delaying means, and for outputting the amplified RF signal.

Moreover, according to the present invention, there is provided:

a method for obtaining a modulated signal, by modulating a carrier signal using a modulating signal, comprising:

extracting a phase signal and an amplitude signal from the modulating signal;

converting the phase signal into an analog signal;

first generating a first oscillation frequency signal;

modulating, in use of quadrature modulation, the analog signal output from the converting step to an IF signal, based on the first oscillation frequency signal;

second generating a second oscillation frequency signal;

converting the frequency of the IF signal output in the modulating step and converting the IF signal into a RF signal, based on the second oscillation frequency signal;

delaying the amplitude signal output in the extracting step for a time; and varying the amplitude of the RF signal and amplifying the varied RF signal in accordance with the delayed amplitude signal output in the delaying step, and outputting the amplified RF signal.

Furthermore, according to the present invention, there is provided:

a method for obtaining a modulated signal, by modulating a carrier signal using a modulating signal, comprising:

extracting a phase signal and an amplitude signal from the modulating signal;

digitally modulating, in use of quadrature modulation, the phase signal to an IF signal;

converting the IF signal into an analog IF signal;

converting the frequency of the analog IF signal and converting the analog IF signal into a RF signal;

delaying the amplitude signal for a time; and varying the amplitude of the RF signal and amplifying the varied RF signal in accordance with the delayed amplitude signal output in the delaying step, and outputting the amplified RF signal.

Still, according to the present invention, there is provided:

a modulation circuit for obtaining a modulated signal, by modulating a carrier signal using a modulating signal, comprising:

means for extracting a phase signal and an amplitude signal from the modulating signal;

means for converting the phase signal into an analog signal;

first means for generating a first oscillation frequency signal;

means for modulating, in use of quadrature modulation, the analog signal output from the converting means to an IF signal, based on the first oscillation frequency signal;

second means for generating a second oscillation frequency signal, means for converting the frequency of the IF signal output from the modulating means and converting the IF signal into a RF signal, based on the second oscillation frequency signal;

means for delaying the amplitude signal output from the extracting means for a time; and means for varying the amplitude of the RF signal and amplifying the varied RF signal in accordance with the delayed amplitude signal output from the delaying means, and for outputting the amplified RF signal;

wherein the delaying means comprises:

means for setting the time based on parameters or variation factors of transfer time differences; and a delay circuit to delay the amplitude signal output from the extracting means in accordance with the time set in the setting means.

Further, according to the present invention, there is provided:

a modulation circuit for obtaining a modulated signal, by modulating a carrier signal using a modulating signal, comprising:

means for extracting a phase signal and an amplitude signal from the modulating signal;

means for converting the phase signal into an analog signal;

first means for generating a first oscillation frequency signal;

means for modulating, in use of quadrature modulation, the analog signal output from the converting means to an IF signal, based on the first oscillation frequency signal;

second means for generating a second oscillation frequency signal, means for converting the frequency of the IF signal output from the modulating means and converting the IF signal into a RF signal, based on the second oscillation frequency signal;

means for delaying the amplitude signal output from the extracting means for a time; and means for varying the amplitude of the RF signal and amplifying the varied RF signal in accordance with the delayed amplitude signal output from the delaying means, and for outputting the amplified RF signal;

wherein the frequency converting means includes a loop for converting the frequency of the IF signal output from the modulating means, based on the IF signal and the RF signal.

Moreover, according to the present invention, there is provided:

a method for obtaining a modulated signal, by modulating a carrier signal using a modulating signal, comprising:

extracting a phase signal and an amplitude signal from the modulating signal;

converting the phase signal into an analog signal;

first generating a first oscillation frequency signal;

modulating, in use of quadrature modulation, the analog signal to an IF signal, based on the first oscillation frequency signal;

second generating a second oscillation frequency signal;

converting the frequency of the IF signal output in the modulating step and converting the IF signal into a RF signal, based on the second oscillation frequency signal;

delaying the amplitude signal output in the extracting step for a time; and varying the amplitude of the RF signal and amplifying the varied RF signal in accordance with the delayed amplitude signal output in the delaying step;

wherein the delaying step comprises:

setting the time based on parameters or variation factors of transfer time differences; and delaying the amplitude signal output in the extracting step in accordance with the time set in the setting step.

Furthermore, according to the present invention, there is provided:

a method for obtaining a modulated signal, by modulating a carrier signal using a modulating signal, comprising:

extracting a phase signal and an amplitude signal from the modulating signal;

converting the phase signal into an analog signal;

first generating a first oscillation frequency signal;

modulating, in use of quadrature modulation, the analog signal to an IF signal, based on the first oscillation frequency signal;

second generating a second oscillation frequency signal;

converting the frequency of the IF signal output in the modulating step and converting the IF signal into a RF signal, based on the second oscillation frequency signal;

delaying the amplitude signal output in the extracting step for a time; and varying the amplitude of the RF signal and amplifying the varied RF signal in accordance with the delayed amplitude signal output in the delaying step;

wherein the frequency converting step includes a phase-synchronizing modulation loop step for converting the frequency of the IF signal output in the modulating step, based on the IF signal and the RF signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a block diagram showing the signal modulation circuit shown in FIG. 3 and illustrating the circuit of quadrature modulator and frequency converter more in detail;

FIGS. 9A and 9B are waveform diagrams of a base band signal input to the signal modulation circuit shown in FIG. 3 and FIG. 4, respectively, an example (A) of amplitude variation to the time of a signal combining an I component and a Q component of aπ/4 shift QPSK modulating signal and an example (B) of phase variation to the time of a signal combining an I component and a Q component of aπ/4 shift QPSK modulating signal;

DETAILED DESCRIPTION OF THE INVENTION

Now, an embodiment of signal modulation circuit of the present invention will be described referring to attached drawings.

Figure 2:
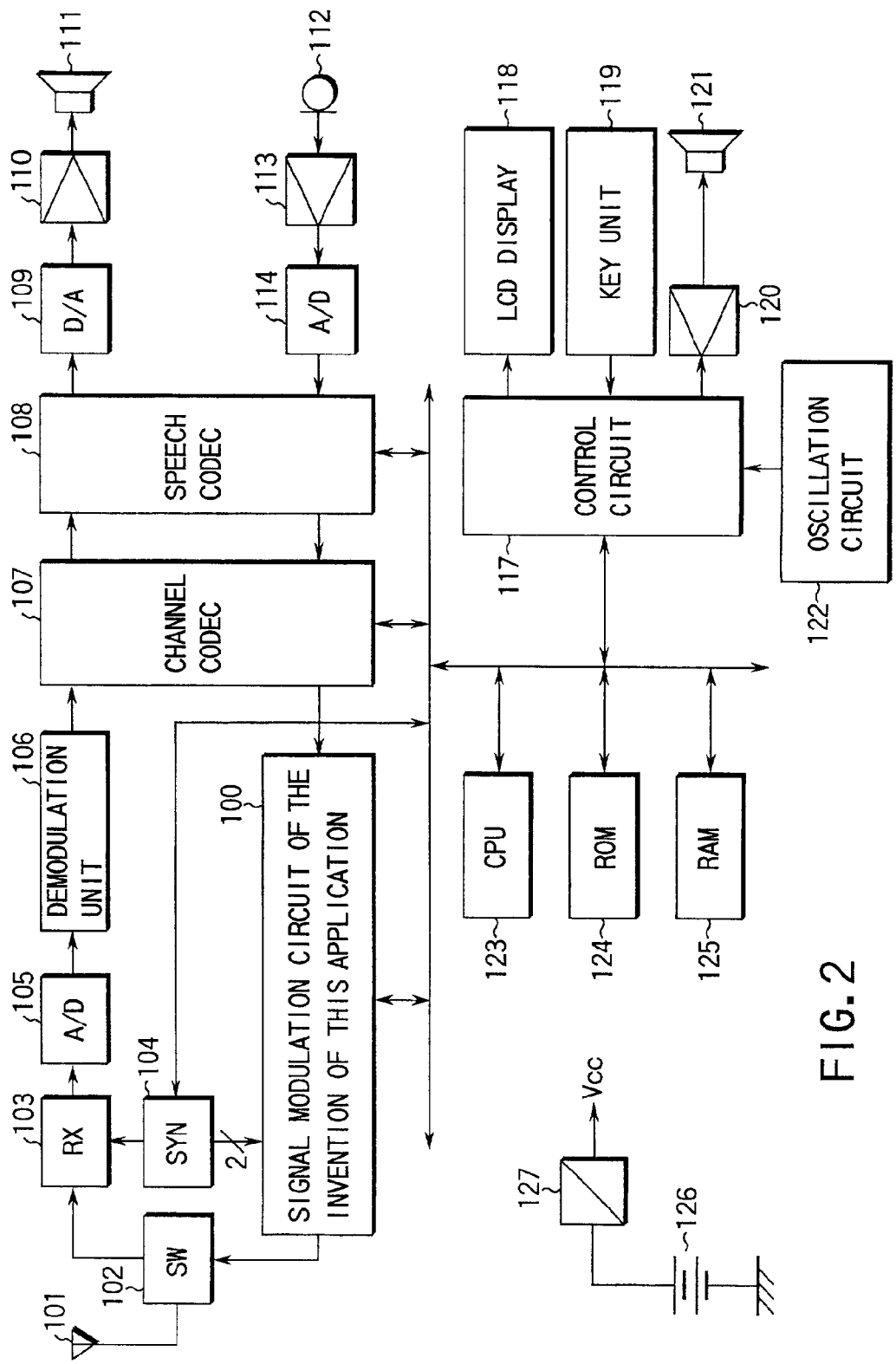
FIG. 2 is a block diagram showing the outline of a cellular phone including a signal modulation circuit according to an embodiment of the present invention.

A concrete example of a signal modulation circuit and a signal modulation method according to an embodiment of the present invention will be described referring to FIG. 2 to FIG. 10. FIG. 2 is a block diagram showing the construction of essential parts of a cellular phone including a signal modulation circuit 100 according to this embodiment.

The cellular phone shown in FIG. 2 comprises an antenna 101, an antenna switch 102, a receiving circuit (RX) 103, a synthesizer circuit (SYN) 104, an analog/digital (A/D) converter 105, a demodulation unit 106, a channel codec 107, a speech codec 108, a digital/analog (D/A) converter 109, a speaker amplifier 110, a speaker 111, a microphone 112, a microphone amplifier 113, an A/D converter 114, a control circuit 117, an LCD display 118, a key unit 119, an amplifier 120, a sounder 121, an oscillation circuit 122, a CPU 123, a ROM 124, a RAM 125, a battery 126 and a stabilizing power supply circuit 127.

There, synthesizer circuit 104, demodulation unit 106, channel codec 107, speech codec 108, control circuit 117, ROM 124 and RAM 125 are connected to the CPU 123 via a control bus.

A radio frequency signal transmitted from a radio base station via a radio communication channel is received by the antenna 101, subjected to electric wave/electric signal conversion, and the converted signal is input into the receiving circuit 103 via the antenna switch 102.

First, the radio frequency signal is amplified in the receiving circuit 103. Then, the radio frequency signal is converted into IF (intermediate frequency) signal through mixing-down using local signal given by the synthesizer circuit 104. Further, this IF signal is amplified by the receiving circuit 103 and, then, demodulated in use of quadrature demodulation.

Here, the synthesizer circuit 104 generates a local signal of the frequency designated by the CPU 123 in accordance with frequency of the radio channel, and the local signal is supplied to the receiving circuit 103 and the signal modulation circuit 100.

An IF signal demodulated in quadrature modulation by the receiving circuit 103, is digitized by the A/D converter 105 and is supplied to the demodulation unit 106.

A signal output from the receiving circuit 103 is demodulated by the demodulation unit 106 and, DC offset elimination, phase synchronization, frame synchronization, waveform equalization, or the like are implemented, and a digital communication signal is reproduced.

The digital communication signal output from the demodulation unit 106 is subjected to deinterleave and error correction decoding in the channel codec 107. This allows to pick up a digital communication signal addressed to self-phone among digital communication signals containing a plurality of channels which are included in the digital communication signal output from the demodulation unit 106.

A digital communication signal output from the channel codec 107 is decoded by the speech codec 108 to reproduce a receiving sound signal.

Then this receiving sound signal is converted to an analog signal by the D/A converter 109, amplified by the speaker amplifier 110, and supplied to the speaker 111. Thereby, the speaker 111 is driven to convert a receiving sound signal into a sound output signal, and the receiving sound is supplied to a user.

On the other hand, the sound voiced by the user is converted into an electric signal, namely a voice signal by the microphone 112. This voice signal is amplified by the microphone amplifier 113 and then digitized by the A/D converter 114.

The digitized voice signal is coded by the speech codec 108 to make a digital origination call signal.

The digital origination call signal obtained by the speech codec 108 is subjected to error correction coding by the channel codec and interleave.

Further, the digital communication signal is input into the signal modulation circuit 100 of the present invention, modulated and amplified as predetermined, and then supplied to the antenna 101 through the antenna switch 102. Thus, the radio frequency signal is transmitted as a radio wave from the antenna 101.

Under the control of the CPU 123, the control circuit 117 controls drive of the LCD display 118 and the sounder 121, and processes an output signal of the key unit 119.

Driven by the control circuit 117, the LCD display 118 displays any image.

The key unit 119 accepts inputs designated by the user concerning telephone number, origination call, termination of a call, character input or function setting.

The amplifier 120 is supplied with a signal output from the control circuit 117 for driving the sounder 121 to ring receiving sound. The amplifier 120 amplifies this signal and this signal is supplied to the sounder 121.

The sounder 121 generates a signal given by the control circuit 117 through the amplifier 120 as a sound output, and thereby rings the receiving sound to inform a receiving signal to the user.

The oscillation circuit 122 supplies the control circuit 117 with a preset clock signal.

The CPU 123 functions based on the operating program stored in the ROM 124. The CPU 123 controls globally each of components in this cellular phone so as to function as a cellular phone.

The ROM 124 is composed of flash ROM or EEPROM. This ROM 124 is used for storing, in addition to the operating program of the CPU 123, melody information, animation information, still image information, specified numbers, information for adjusting radio apparatus or various information to be stored permanently.

The RAM 125 is used for storing setting states of the cellular phone, for example, telephone numbers, digitized recording signals, user input character information, user input melody information or various information to be stored for a relatively short period. As supported by a backup battery not shown, this RAM 125 can safely stored information for a relatively long period.

The battery 126 is a secondary battery and generates electric power to be supplied to each of components of this cellular phone.

The stabilizing supply circuit 127 stabilizes the power output from the battery 126 for supplying to each of components.

A concrete example of the signal modulation circuit 100 included in the aforementioned cellular phone will be described referring to FIG. 3 and FIG. 4. In this example, a RF signal can be obtained with little out of band undesired signal even for a modulating signal containing amplitude variation, by means of a variable gain device 9 for varying gain based on the amplitude signal extracted from the modulating signal.

Figure 1:
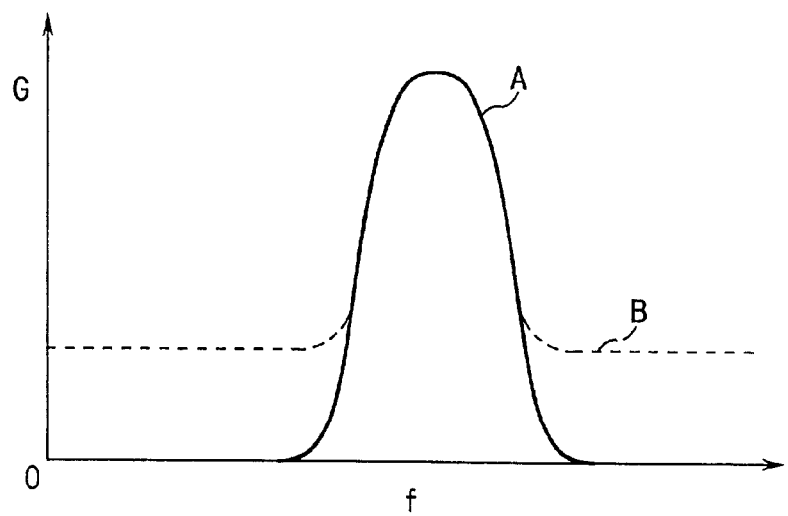
FIG. 1 is a spectral distribution diagram showing schematically a modulated wave containing information which should be transmitted (wave A) and a carrier having wave including out of band undesired signal (wave B)
Figure 3:
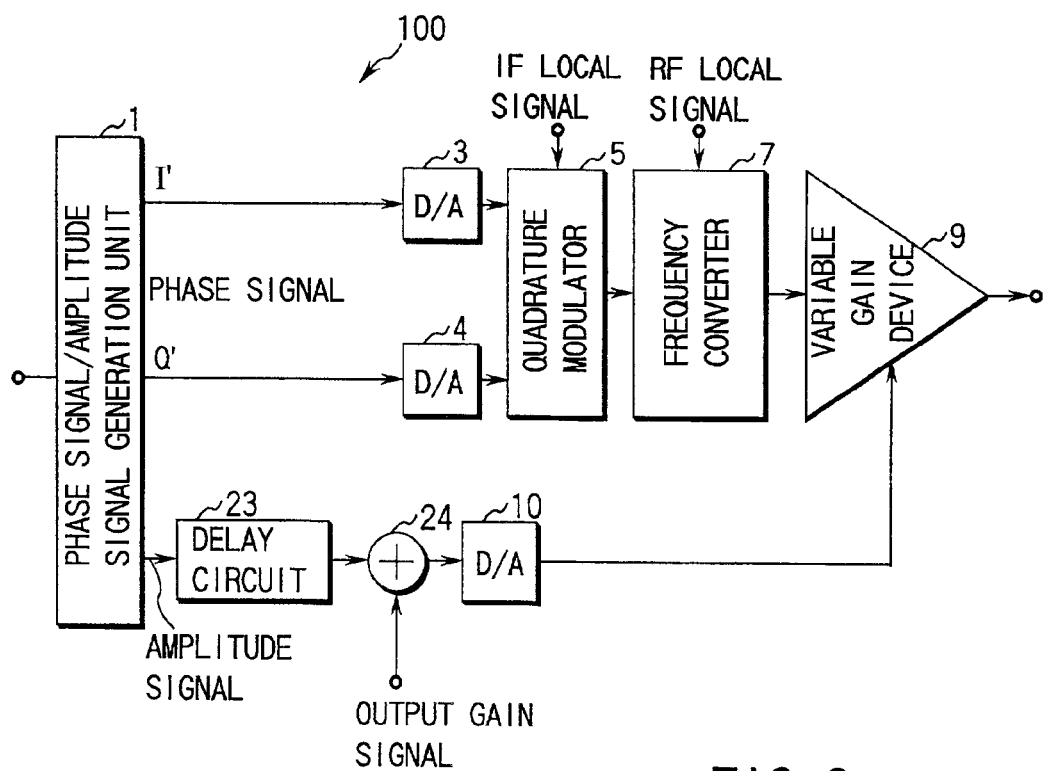
FIG. 3 is a block diagram showing the signal modulation circuit shown in FIG. 2.

The modulation circuit shown in FIG. 3 comprises a phase signal/amplitude signal generation unit 1, D/A converters 3, 4, 10, a quadrature modulator 5, a frequency converter 7, a variable gain device 9, a delay circuit 23 and an adder 24.

In the aforementioned construction, a phase signal component and amplitude signal component are extracted from the modulating signal by this phase signal/amplitude signal generation unit 1. The phase signal component is decomposed into I' (t), Q'(t) quadrature components.

Here, suppose a wave amplitude signal of a base band modulation is A(t), a phase signal of the base band modulation wave is θ(t), an in-phase component I(t) and a quadrature component Q(t) of the base band modulation wave are expressed as follows respectively:

$I(t) = A(t)\cos\theta(t);$ $Q(t) = A(t)\sin\theta(t).$

In this modulation wave, when a carrier having frequency fc is modulated, the modulated wave s(t) can be expressed by:

$$s(t) = I(t)\cos(2\pi fct) - Q(t)\sin(2\pi fct)$$
$$= A(t)\cos\theta(t)\cos(2\pi fct) - A(t)\sin\theta(t)\sin(2\pi fct)$$
$$= A(t)\cos(2\pi fct + \theta(t)).$$

Then, I' (t), Q' (t) can be expressed as cos θ(t) and sin θ(t) respectively having an amplitude component 1. Hereinafter, I' (t), Q' (t) will be described simply as I' and Q'.

At a position indicated on the IQ plane where the phase signal corresponds to a transmission information, the magnitude of a vector having the I' and Q' quadrature components is always constant. When the modulation form is, for instance, QPSK, the magnitude of a vector having I' and Q' quadrature components is always constant at four signal points on the IQ plane. In the other modulation forms, π/4 shift QPSK, the magnitude of a vector having I' and Q' quadrature components is always constant at eight signal points on the IQ plane. In other words, at eight signal points on the IQ plane, components I' and Q' are in the following relationship:

$$I'^2+Q'^2=\text{constant}.$$

As for these phase signal and amplitude signal, as a concrete example, values stored previously in the memory may be read out corresponding to a modulating signal given by the control of CPU and output as a phase signal and amplitude signal.

A base band digital modulating signal is supplied from the phase signal/amplitude signal generation unit 1 to the D/A converters 3, 4 and is converted into an analog signal. In the quadrature modulator 5, an IF local signal is converted in a method of quadrature modulation with use of output signals from the D/A converters 3, 4, and the IF local signal converted in a method of quadrature modulation is output from the quadrature modulator 5.

In the frequency converter 7, frequency of the IF signal is converted into carrier frequency using a RF local signal input from an input terminal of the RF local signal. In general, the IF signal frequency $f_{IF}$, the RF local signal frequency $f_{local}$ and the carrier frequency $f_{carrier}$ have a following relationship:

$$f_{carrier}=f_{local}-f_{IF},$$

or $$f_{carrier}=f_{local}+f_{IF}.$$

Here, carrier wave can be set to frequency corresponding to respective channels by making frequency $f_{local}$ of the RF local signal variable.

The delay circuit 23 adjusts transfer time difference between a system of a D/A converter 34, a quadrature modulator 5 and a frequency converter 7 on a transmission line of the phase signal, and a system of a delay circuit 23, an adder 24 and a D/A converter 10 on a transmission line of the amplitude signal. After the modulating signal passes the delay circuit 23, the amplitude signal of the modulating signal is synthesized, by the adder 24, with an output gain signal designating the output electric power average value to be transmitted. The output signal of the adder 24 is converted into an analog signal by the D/A converter 10 and becomes a gain control signal of the variable gain device 9.

The variable gain device 9 amplifies power of the phased modulated RF signal output from the frequency converter 7 with a gain indicated by gain control signal output from the D/A converter 10. A modulated wave signal can be obtained with the output from the variable gain device 9 by synthesizing a phase signal and an amplitude signal of the modulation wave.

In this embodiment, a phase-synchronizing modulation loop 70 is applied as a frequency converter 7 of the modulation circuit, as shown in FIG. 4. FIG. 3 shows a block diagram of the signal modulation circuit when the phase-synchronizing modulation loop 70 is applied as a frequency converter 7.

The circuit shown in FIG. 4 can generate PSK (Phase Shift Keying) signal such as GMSK modulation.

In FIG. 4, this modulation circuit comprises a phase signal/amplitude signal generation unit 1, D/A converters 3, 4, an quadrature modulator 5, and an IF synthesizer 6. Here, the quadrature modulator 5 comprises multipliers 51, 52, phase shifters 53, 54 and an adder 55. Moreover, a phase-synchronizing modulation loop 70, an RF synthesizer 8 and a PA (power amplifier) 9 are included. Here, the phase-synchronizing modulation loop 70 comprises a low-pass filter 71, an M counting-down circuit 72, a down converter mixer 73, a low-pass filter 74, an N counting-down circuit 75, a PFD (phase frequency detector) 76, a loop filter 77 and a VCO (voltage controlled oscillator) 78. Moreover, an D/A converter 10 is connected to the PA 9.

Now, the operation of the aforementioned signal modulation circuit will be described. Components I' and Q' are input to the D/A converters 3, 4 from the phase signal/amplitude signal generation unit 1 to which base band digital modulation signal is given. In the D/A converters 3, 4, a base band digital modulation signal input from the phase signal/amplitude signal generation unit 1 is converted into an analog signal. Output signals from the D/A converters 3, 4 are frequency converted into modulated IF signal in quadrature modulation, through multiplication by the output signal of the IF synthesizer 6 in the quadrature modulator 5. In case of multiplying the output signal of the IF synthesizer 6 by the output signal from the D/A converters 3, 4, the difference between the phase of the output signal of the IF synthesizer 6 to multiply with the output signal from the D/A converter 3, and the phase of the output signal of the IF synthesizer 6 to multiply with the output signal from the D/A converter 4 is set to 90 degrees ($\pi/2$[rad]). Then, by multiplying with the output signal from the multipliers 51, 52, modulated IF signal in use of quadrature modulation is output as output signal of the quadrature modulator 5. In other words, the phase shifter 53 delays phase of the output signal from the IF synthesizer 6 by 45 degrees ($\pi/4$ [rad]), while the phase shifter 54 advances phase of the output signal from the IF synthesizer 6 by 45 degrees ($\pi/4$[rad]). Each of phase shifted signals is supplied to the multipliers 51, 52 as a local signal. These phase shifters 53, 54 make the phase difference between the local signal input to the multiplier 51 and the local signal input to the multiplier 52 is set 90 degrees ($\pi/2$[rad]). By adding the output signal from the multipliers 51, 52 in the adder 55, modulated IF signal in use of quadrature modulation is output as a output signal of the quadrature modulator 5.

The phase-synchronizing modulation loop 70 frequency converts the IF signal output from the quadrature modulator 5 into a desired carrier frequency, using the RF synthesizer 8 as a local signal. In the low-pass filter 71, harmonic components of the IF signal which is an output signal of the quadrature modulator 5 is eliminated, and the output signal is input into the M counting-down circuit 72. The down converter mixer 73 converts the frequency of the modulated RF signal, by multiplying modulated RF signal of the VCO 78, mentioned below, and a local signal of the RF synthesizer 8. The low-pass filter 74 eliminates image signals or spurious signals included in the output signal of the down converter mixer 73. The N counting-down circuit 75 divides frequency of an output signal of the low-pass filter 74 by N. The PFD 76 compares frequency or phase of an output signal of the M counting-down circuit 72 and the N counting-down circuit 75, and outputs a signal corresponding to two input signals to be compared. The loop filter 77 smoothes an output signal of the PFD 76 and, also, determines characteristics of this phase-synchronizing modulation loop 70. The VCO is a voltage control oscillator to change the frequency to be oscillated corresponding to an input control voltage.

Signal polarity or other characteristics output from the PFD 76 can be set variously. Here, for example, if output signal frequency of the M counting-down circuit 72 is higher than output signal frequency of the counting-down circuit 75, or output signal phase of the M counting-down circuit 72 is in advance of output phase of the counting-down circuit 75, it is set to output positive pulse current and to enlarge the pulse width in proportion to their value difference. The loop filter 77 smoothes pulse current which is a PFD 76 output signal, and outputs a voltage corresponding to the pulse width. The VCO 78 control characteristics are set to advance the phase and raise the oscillation frequency as much as the input voltage value is higher. In other words, if the output signal phase of the M counting-down circuit 72 is in advance of the output phase of the N counting-down circuit 75, the phase of the voltage control oscillator 78 is controlled to advance. Now, if the RF synthesizer 8 frequency is set to lower side frequency of the carrier, the down converted signal phase advances as much as the voltage control oscillator 78 phase advances. Consequently, the output signal phase of the N counting-down circuit 75 that has divided the frequency of the down converted signal. On the other hand, if the output signal phase of the N counting-down circuit 75 is in advance of the output phase of the M counting-down circuit 72, this phase-synchronizing modulation loop 70 delays the oscillation phase of the voltage control oscillator 78. Namely, this phase-synchronizing modulation loop 70 follows the phase of IF signal from the quadrature modulator 5, and the phase of the voltage control oscillator 78 changes. Eventually, the oscillation frequency of the voltage control oscillator 78 is locked, and this oscillation frequency corresponds to the carrier frequency f carrier generated by the signal modulation circuit. The value of this carrier frequency is as follows:

$$f_{carrier}=(N/M)f_{IF}+f_{local}.$$

Here, $f_{local}$ is oscillation frequency of the RF synthesizer 8, $f_{IF}$ is IF oscillation frequency of the synthesizer 6, M is division numbers of the counting-down circuit 72 and N is division numbers of the counting-down circuit 75.

Carrier phase of each channel can be modulated by changing frequency $f_{carrier}$ of the RF synthesizer 8 in correspondence with the channel.

The power amplifier 9 amplifies an output signal from the phase-synchronizing modulation loop 70 to a predetermined output power. An output power of the power amplifier 9 is controlled by a control unit not shown.

As mentioned above, since in the signal modulation circuit shown in FIGS. 3, 4 the phase-synchronizing modulation loop is constructed in accordance with frequency in the loop filter, a frequency error or undesirable spurious emission diminish, allowing to obtain a good modulation spectral characteristics, if a loop gain is sufficient.

The signal modulation circuit of the present invention may modulate a modulating signal to a carrier with little out of band undesired component, even if the modulating signal has unstable and variable amplitude. In other words, even when the modulation form is changed from GMSK (Gaussian-filtered Minimum Shift Keying) to π/4 shift QPSK, a signal from a signal processing unit not shown controls delay time of the delay circuit 23, and therefore the signal can be modulated into a carrier with little out of band undesired component.

Now, signal characteristics of GMSK which is a modulation form with stable and invariable amplitude, and signal characteristics of π/4 shift QPSK which is a modulation form with unstable and variable amplitude are described referring to FIG. 5A and FIG. 5B to FIG. 10.

Figure 5A:
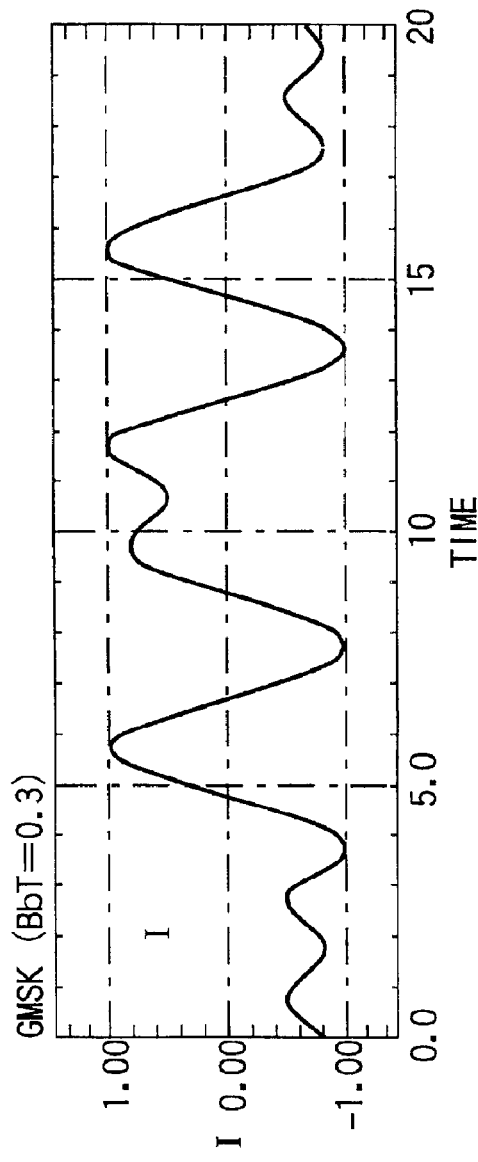
FIGS. 5A and 5B are waveform diagrams of a base band signal input to the signal modulation circuit shown in FIG. 3 and FIG. 4, respectively, an example (A) of amplitude variation to the time of an I component of a GMSK modulating signal and an example (B) of amplitude variation to the time of a Q component of a GMSK modulating signal.
Figure 5B:
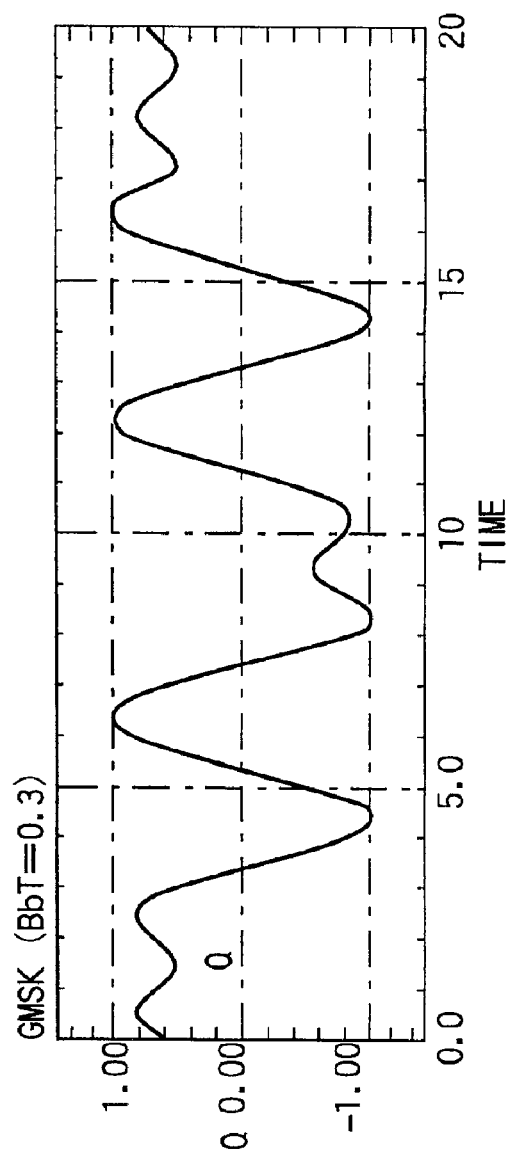
Figure 6A:
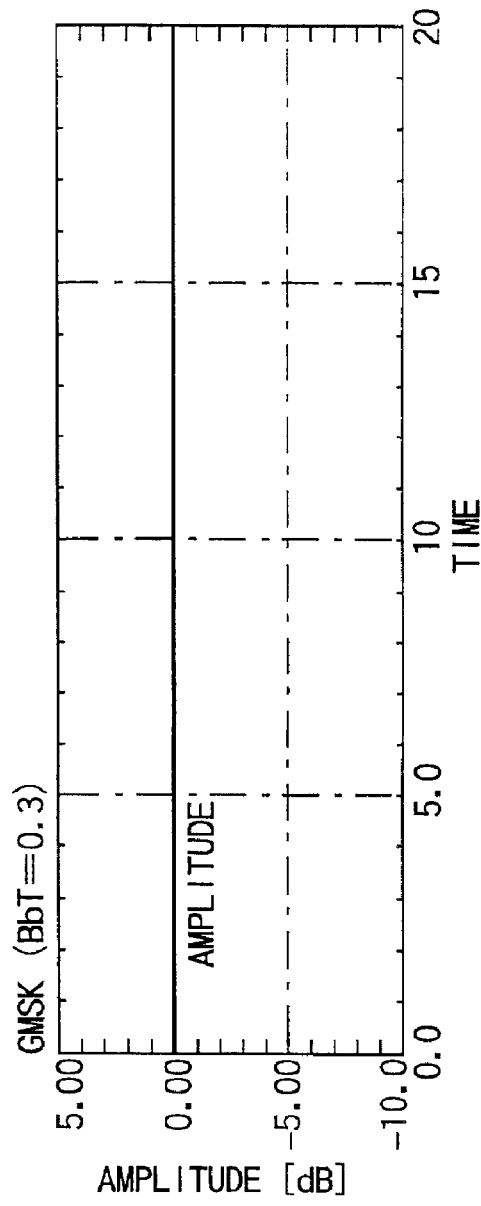
FIGS. 6A and 6B are waveform diagrams of a base band signal input to the signal modulation circuit shown in FIG. 3 and FIG. 4, respectively, an example (A) of amplitude variation to the time of a signal combining an I component and a Q component of a GMSK modulating signal and an example (B) of phase variation to the time of a signal combining an I component and a Q component of a GMSK modulating signal.
Figure 6B:
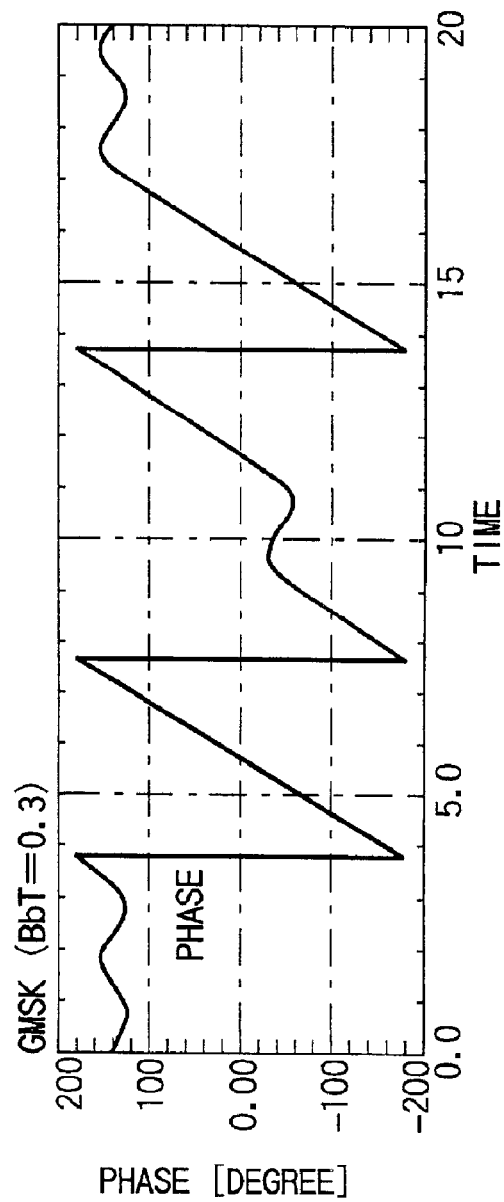
Figure 7:
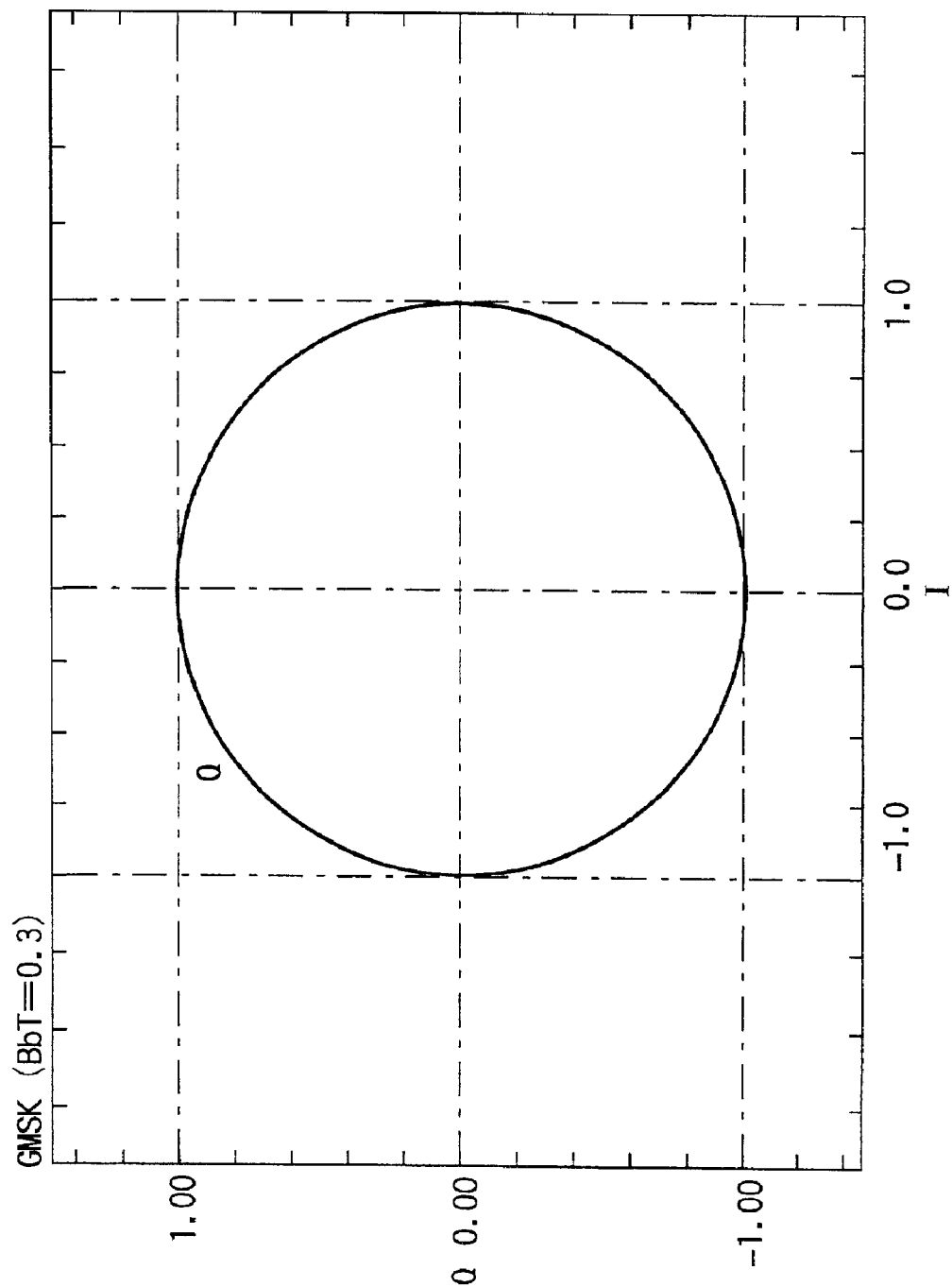
FIG. 7 is a waveform diagram of a base band signal input to the signal modulation circuit shown in FIG. 3 and FIG. 4, and is a diagram showing a trajectory on an IQ plane, for components I and Q of a GMSK modulating signal.

FIG. 5A and FIG. 5B shows an example of waveform according to time of components I and Q in base band digital modulating signals of GMSK. The time axis which is a horizontal axis shown in FIG. 5A and FIG. 5B, is normalized with a symbol rate. FIG. 6A and FIG. 6B shows an amplitude component and phase component which are divided from the waveform shown in FIG. 5A and FIG. 5B. FIG. 7 shows, on the IQ plane, the I component and Q component shown in FIG. 5A and FIG. 5B.

As it is obvious from FIG. 6A, an amplitude signal of GMSK signal is always constant. In FIG. 7, it is also understandable that the amplitude is constant, as an orbit of points of positioning a phase signal on the IQ plane are always on a constant circle.

Figure 8A:
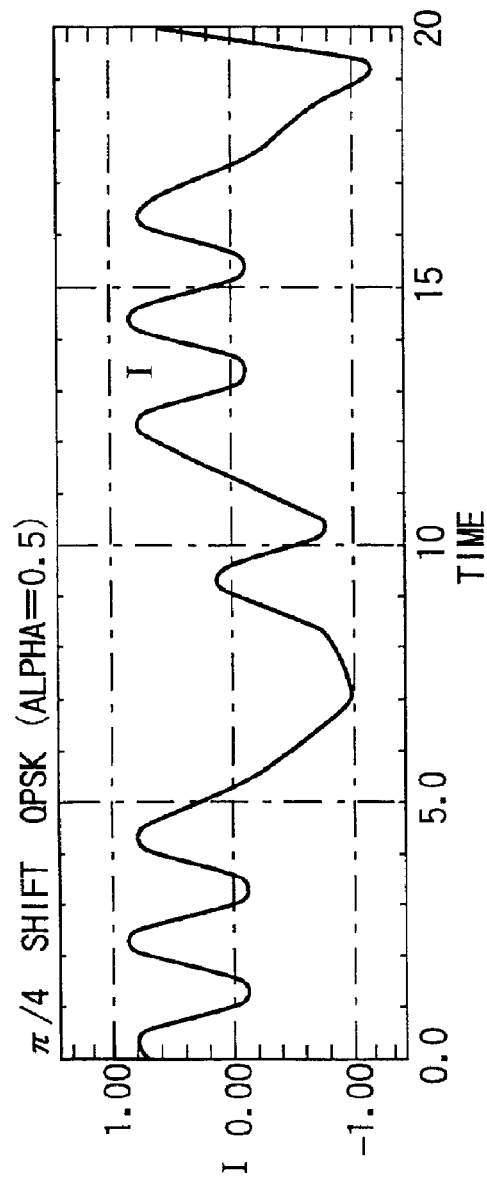
FIGS. 8A and 8B are waveform diagrams of a base band signal input to the signal modulation circuit shown in FIG. 3 and FIG. 4, respectively, an example (A) of amplitude variation to the time of an I component of aπ/4 shift QPSK modulating signal and an example (B) of amplitude variation to the time of a Q component of aπ/4 shift QPSK modulating signal.
Figure 8B:
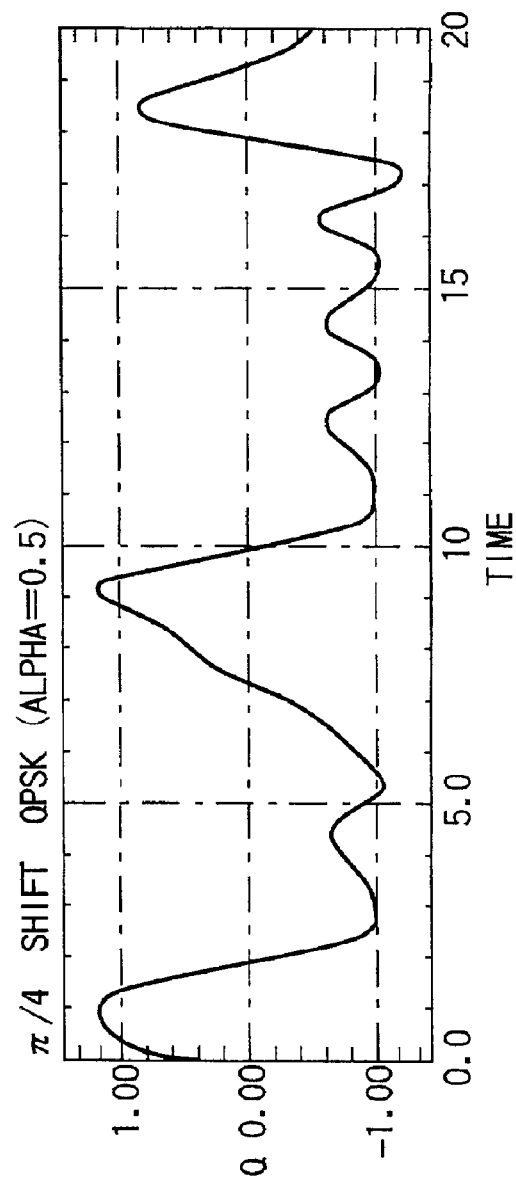
Figure 10:
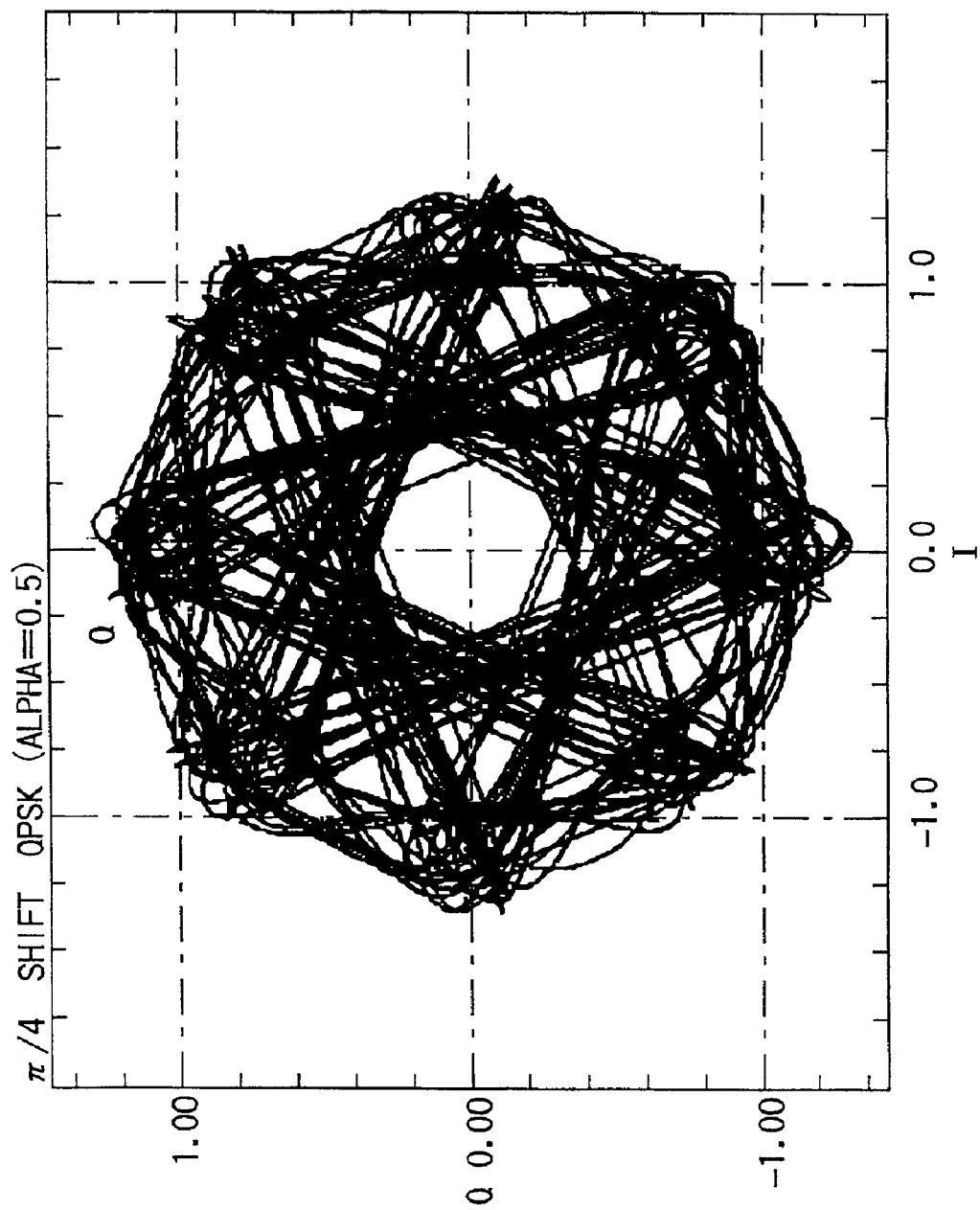
FIG. 10 is a waveform diagram of a base band signal input to the signal modulation circuit shown in FIG. 3 and FIG. 4, and is a diagram showing a trajectory on an IQ plane, for components I and Q of aπ/4 shift QPSK modulating signal.

On the other hand, FIG. 8A and FIG. 8B shows an example of waveform according to time of components I and Q in base band digital modulating signals of π/4 shift QPSK. As shown in FIG. 5A and FIG. 5B, the horizontal axis of FIG. 8A and FIG. 8B is normalized with a symbol rate. FIG. 9A and FIG. 9B shows an amplitude component and phase component which are divided from the waveform shown in FIG. 8A and FIG. 8B. FIG. 10 shows, on the IQ plane, the I component and Q component shown in FIG. 8A and FIG. 8B.

As it is obvious from FIG. 9A and FIG. 9B, the amplitude signal of the QPSK signal contains an amplitude variation of about −8[dB] to +2[dB]. Also in FIG. 10, it is understandable that the amplitude varies with time, as an orbit of points of positioning an I components and a Q components on the IQ plane does not remain on a constant circle.

Using the signal modulation circuit and signal modulation method of this embodiment, it becomes possible to provide a cellular phone allowing to obtain a RF signal with little out of band undesired component even if the modulating signal contains an amplitude variation, by means of a variable gain device 9 changing a gain based on amplitude signal which is extracted from the modulating signal.

Figure 11:
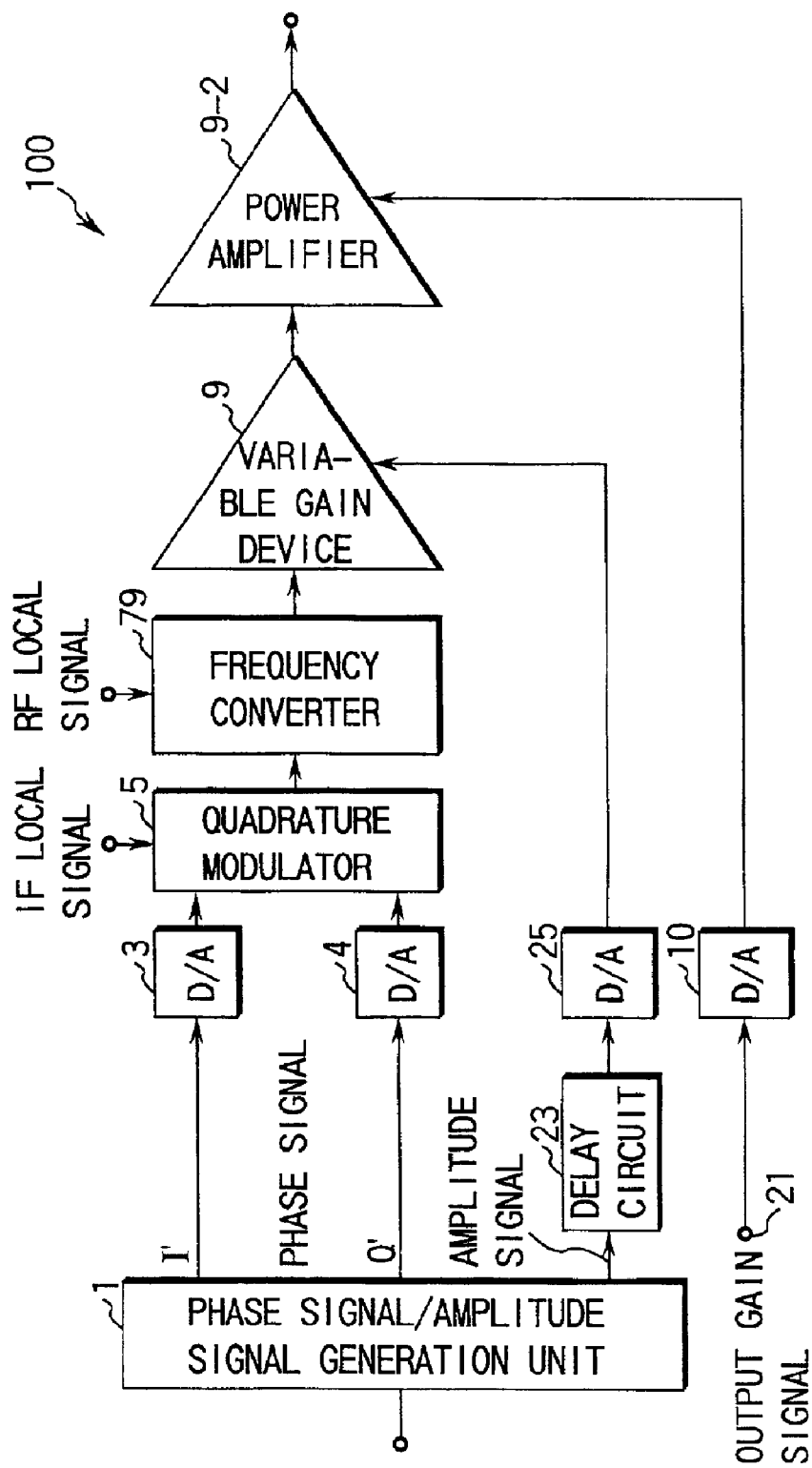
FIG. 11 is a block diagram showing the outline of a signal modulation circuit according to another embodiment of the present invention.

A concrete example of signal modulation circuit 100 contained in the cellular phone of another embodiment of the present invention will be described referring to FIG. 11 and FIG. 12. This embodiment corresponds to a signal modulation circuit provided further with a power amplification unit mounted behind the variable gain device 9. The modulation circuit shown in FIG. 11 is provided further with a power amplifier 9-2 and a D/A converter 10 connected to the power amplifier 9-2, in addition to the construction shown in FIG. 3.

In the signal modulation circuit shown in FIG. 3, a power gain signal and amplification signal designating output average power were synthesized in the adder 24 placed in the base band digital unit. In this embodiment, the output average power is controlled separately from the control according to delay the amplitude signal. Namely, an amplification gain is changed by inputting only an output gain signal corresponding to output average power into the power amplifier 9-2 through the D/A converter 10. The amplitude signal is converted, after transfer time is adjusted by the delay circuit 23, into an analog value by a newly mounted D/A converter 25, and then inputs as a gain control signal of the variable gain device 9. The amplitude signal of modulating signal in the variable gain device 9 is synthesizing with a signal modulated in phase, the signal being output from the frequency converter 7, and then a modulated wave is output from the variable gain device 9. Moreover, the output signal of the variable gain device 9 is power amplified in the power amplifier 9-2 in corresponding with the output average power value, and in final a transmission signal is output. This series of operations assures a high precision modulation.

It is also possible to construct the aforementioned modulation circuit by replacing the order of the variable gain device 9 and the power amplifier 9-2 controlled respectively by the D/A converters 10, 25. Namely, it may so construct to control the gain of the power amplifier 9-2 by the output signal of the D/A converter 25, and the gain of the variable gain device 9 by the output signal of the D/A converter 10.

Figure 12:
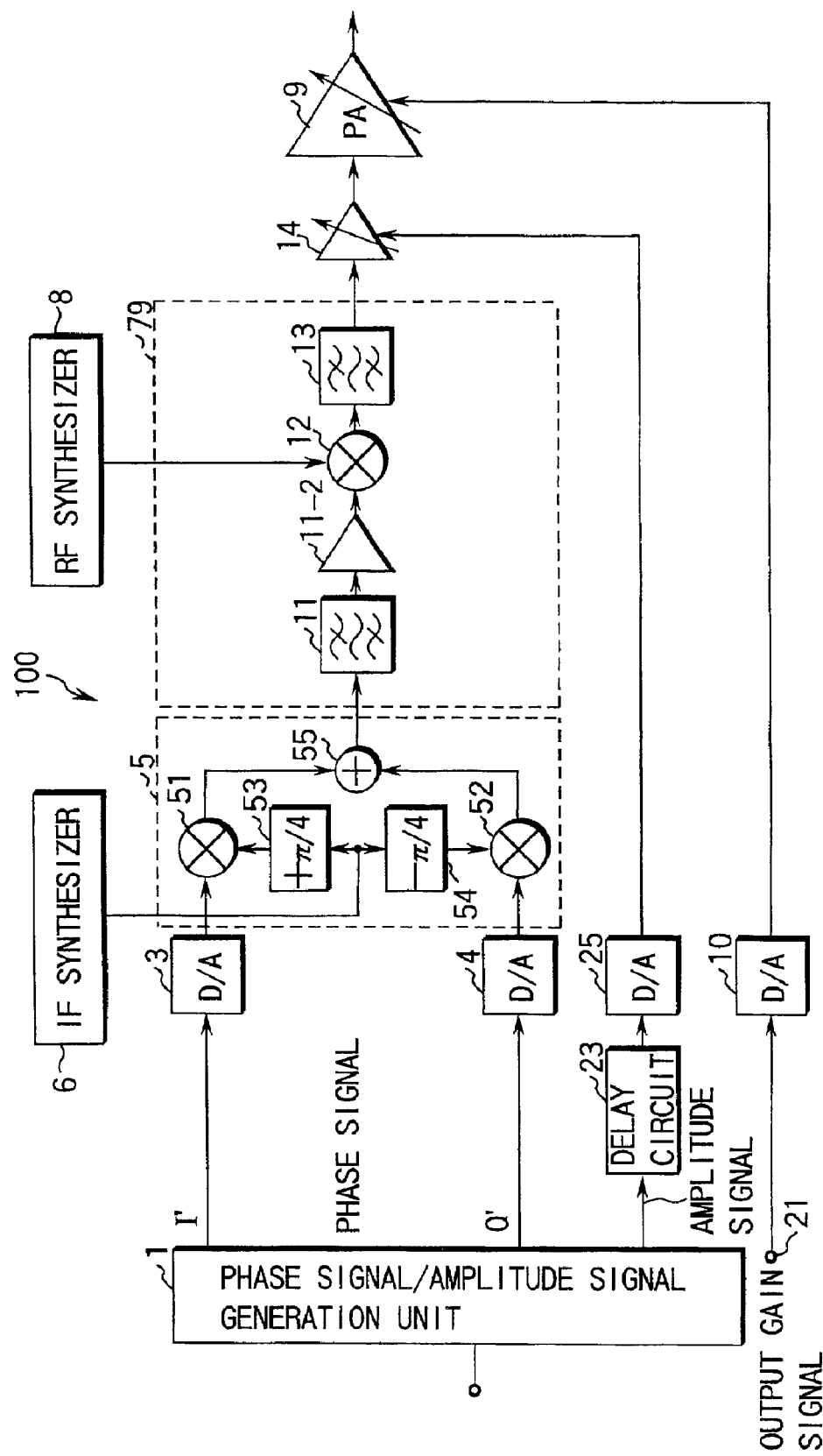
FIG. 12 is a block diagram showing the signal modulation circuit shown in FIG. 11 and illustrating the circuit of quadrature modulator and frequency converter more in detail.

To be more detailed, as shown in FIG. 12, an up-converting mixer 12 is used inside a frequency converter 79.

In FIG. 12, this frequency converter 79 comprises an IF band pass filter 11, a limiting amplifier 11-2, an up-converting mixer 12 and a band pass filter 13. Signal-to-noise ratio of the IF signal input into the up-converting mixer 12 can be improved by further amplifying an amplitude of the IF signal passed through the IF band pass filter 11.

In other words, since a mixer 12, a variable gain device 9 or the like may be operated in non linearity with respect to an amplitude, transmission of good signal-to-noise ratio can be realized with low power consumption.

In FIG. 12, the signal modulation circuit comprises a phase signal/amplitude signal generation unit 1, D/A converters 3,4, an quadrature modulator 5, an IF synthesizer 6 and an RF synthesizer 8.

Out of band undesired signal components of an output signal from the quadrature modulator 5 is eliminated by the band-pass filter 11, multiplied with a local signal output from the RF synthesizer 8 in the up-converting mixer 12, and then frequency of the out of band undesired signal components is converted into that in radio frequency band. As an output signal of the mixer 12 includes an image signal, a spurious signal or out-of-ban noise components, these signal and noise component are eliminated by the band pass filter 13 to obtain a carrier of a genuine wave which contains information to be transferred. An output signal of filter 13 is previously filtered by a driver amplifier 14 and then input into the power amplifier 9. A power gain of the power amplifier 9 is controlled by a control unit not shown.

In the modulation circuit and method, as a phase synchronization loop is not formed, noise from respective steps preceding to the power amplifier 9 are added up, and they are and appear in an output signal of the power amplifier 9. In order to prevent noise from leaking out of this system transmission band, normally, a system band pass filter having a steep band selection characteristics is set at an output of the power amplifier 9.

Figure 13:
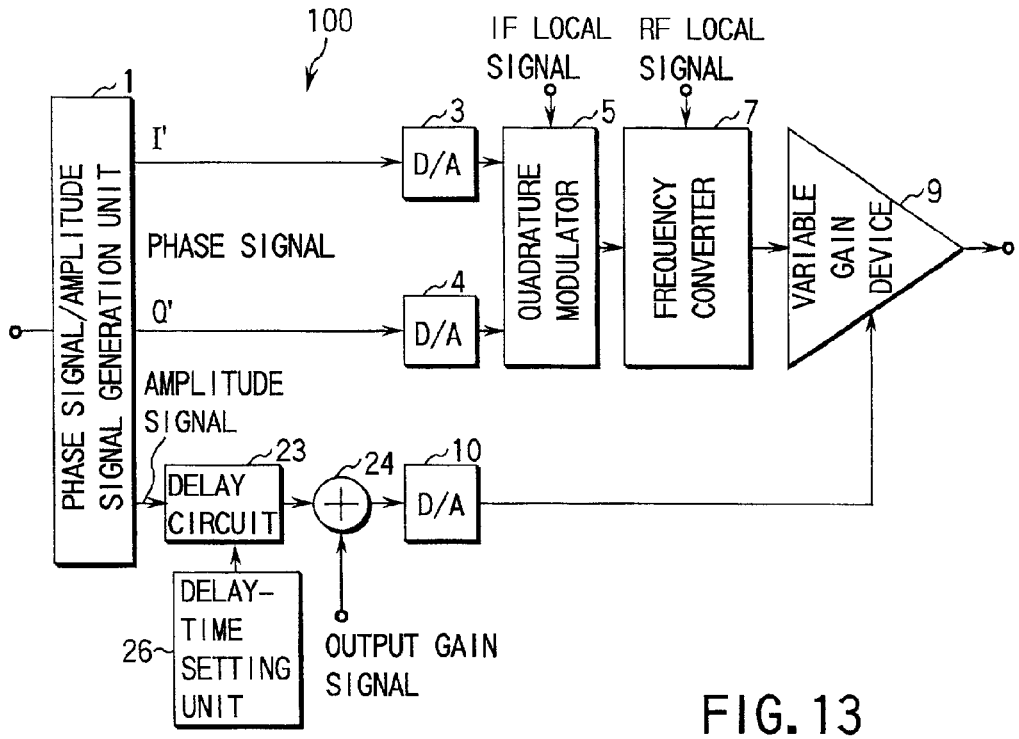
FIG. 13 is a block diagram showing the outline of a signal modulation circuit according to further another embodiment of the present invention.

A concrete example of signal modulation circuit 100 contained in the cellular phone of further another embodiment of the present invention will be described referring to FIG. 13. This embodiment corresponds to a signal modulation circuit provided further with a delay-time setting unit 26 which sets the necessary time corresponding to the transfer path, for setting the delay time precisely by this delay-time setting unit. Here, the delay circuit 23 can change delay time by a delay time signal input from the delay-time setting unit 26. In other word, the delay circuit 23 is inserted into the transfer path to adjust transfer time difference between a phase signal passing through D/A converters 3, 4, quadrature modulator 5 and frequency converter 7 on the transfer path, and an amplitude signal passing through delay circuit 23 and D/A converter 10 on the transfer path. There, quadrature modulator 5 and frequency converter 7 are similar to the quadrature modulator 5, frequency converter 70 or frequency converter 79 shown in FIG. 4 or 12. Moreover, circuit components not otherwise specified are similar to those shown in FIG. 3 or FIG. 4.

The delay time of each of transfer paths is not always constant, but it may vary according to modulating signal type, modulation index, frequency, level diagram in each step (namely, gain in each step), ambient temperature or other various factors. As the delay circuit 23 is provided with a function to vary the delay time, in case a roll off rate of the modulating signal of $\pi/4$ shift QPSK, for example, varies or in another case a system communication band has shifted considerably, the delay circuit 23 delay time can be adjusted for the best modulation by a command from the signal processing unit not shown. Consequently, in the delay-time setting unit 26, out of band undesired component can be reduced precisely, by setting optimal delay time of each moment, based on parameters or variation factors of transfer time difference, such as, at least ambient temperature, modulating signal frequency, supply voltage, or the like.

A concrete example of the signal modulation circuit 100 contained in the cellular phone of still another embodiment of the present invention will be described referring to FIG. 14. This embodiment corresponds to a signal modulation circuit wherein linearity of an amplitude signal delayed by the delay unit 23 and added with an output gain signal designating the output average power, is compensated by a linearity correction unit.

Figure 14:
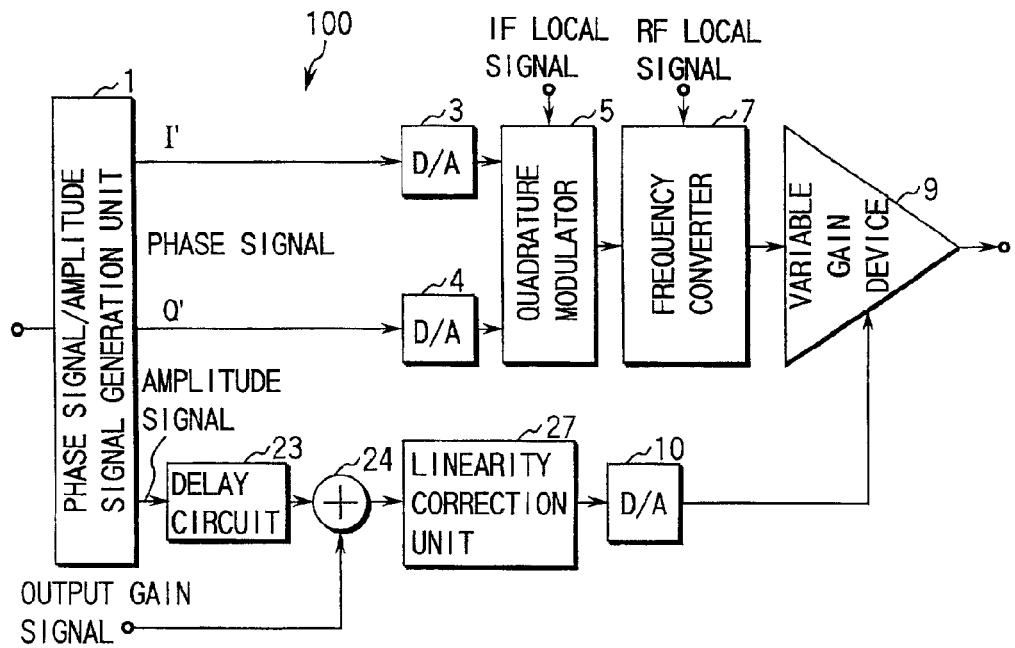
FIG. 14 is a block diagram showing the outline of a signal modulation circuit according to still another embodiment of the present invention.

The linearity correction unit 27 shown in FIG. 14 is the one for correcting the linearity between an input value and an output value based on an expression for defining the output value or a conversion table, according to the input value. The linearity correction unit 27 corrects the linearity of output power characteristics in function of control voltage of the variable gain device 9. There, quadrature modulator 5 and frequency converter 70 are similar to the quadrature modulator 5, frequency converter 70 shown in FIG. 4. Moreover, circuit components not otherwise specified are similar to those shown in FIG. 3 or FIG. 4.

Figure 15:
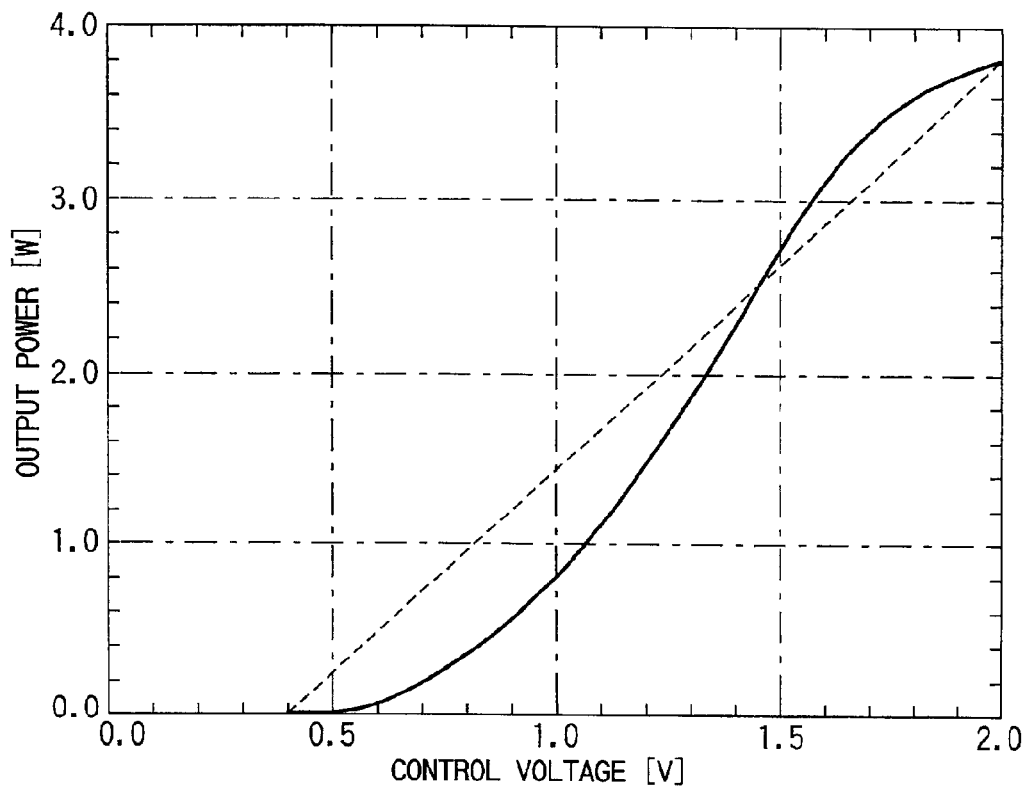
FIG. 15 is a graph of output power for control voltage in the linearity correction unit shown in FIG. 14, showing an actual response curve (solid line) illustrating the output power response to the control voltage, and an ideal response straight line (dotted line) illustrating the output power response to the control voltage.

Now, an example of output power characteristics in function of control voltage of the variable gain device 9 is shown in FIG. 15. In FIG. 15, the horizontal axis shows the control voltage, and the vertical axis shows the output power. In the example of the output power characteristics in function of the control voltage shown in FIG. 15, the relationship between the control voltage and the output power of the variable gain device 9 is certainly monotonic increase, but its linearity is not good. Therefore, the linearity correction unit 27 corrects to obtain linearity of relationship between the amplitude signal of the modulating signal and the output power. In this embodiment, characteristics of output power versus modulated amplitude are corrected as the dotted line shown in FIG. 15. For instance, in order to obtain an output power of 1[W], a digital value showing 0.82[V] is input to the linearity correction unit 27, however, a digital value showing 1.07 [V] is output from the linearity correction unit 27. Namely, the linearity correction unit 27 is provided with a conversion table for outputting an input value in regarding the input value of the horizontal axis shown by the broken line in FIG. 15 as that of the horizontal axis shown by the solid line in FIG. 15.

Otherwise, a conversion formula to describe the solid line by an approximation formula is given. Suppose output power in the variable gain device 9 is Po and control voltage Vcnt, Po and Vcnt can be related by the expression:

$$Po = A \times Vcnt + B,$$

for the straight line. If the correspondence is made, for instance, by the expression:

$$Po = C \times (1 - \cos(D \times Vcnt)),$$

output power modulation amplitude characteristics closer to the straight line, compared to the output power modulation amplitude characteristics before the linear correction, can be obtained by such linear correction.

Even if the linearity of the variable gain device 9 gain control characteristics is not good, the modulation accuracy of an output wave of a final modulation wave synthesized by the variable gain device 9 can be maintained, as the linearity correction unit 27 can compensate according to that linearity.

Figure 16:
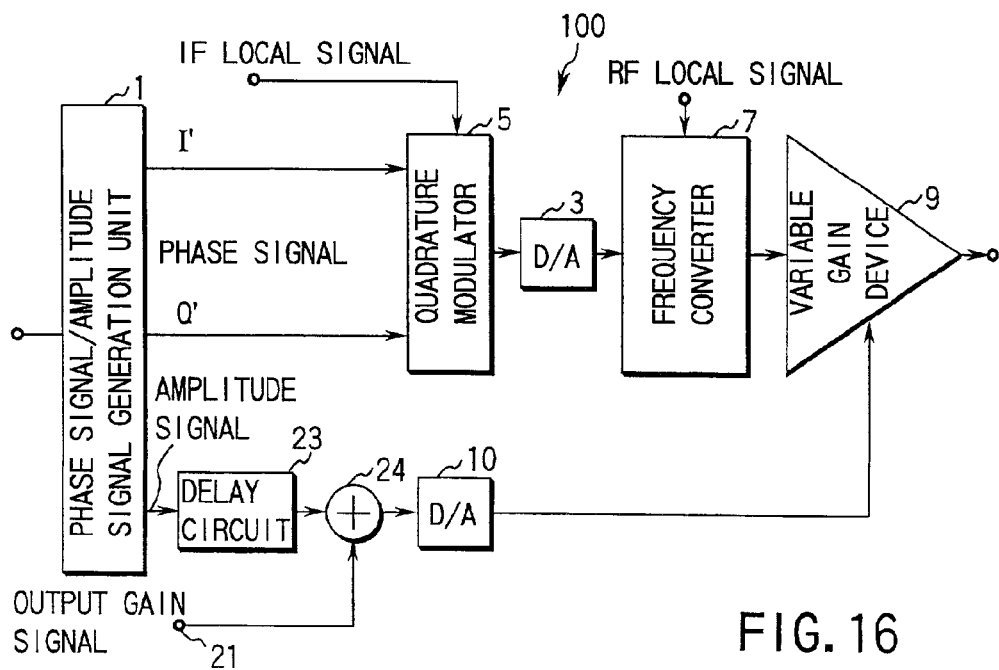
FIG. 16 is a block diagram showing the outline of a signal modulation circuit according to further still another embodiment of the present invention.

A concrete example of signal modulation circuit 100 contained in the cellular phone of further still another embodiment of the present invention will be described referring to FIG. 16. This embodiment corresponds to a signal modulation circuit wherein the processing is implemented by a digital type quadrature modulator 56. There, the frequency converter 7 is similar to the frequency converter 70 shown in FIG. 4. Moreover, circuit components not otherwise specified are similar to those shown in FIG. 3 or FIG. 4.

In this embodiment, the modulation processing is implemented by a digital signal processor (DSP) 56. Frequency of I' and Q' quadrature phase components in a base band modulation digital phase signal are digitally converted by an IF local signal. Thereafter, the IF signal converted in a method of quadrature modulation by the DSP 56 is converted into an analog signal by the D/A converter 3, and then input into frequency converter 7. Here, the frequency of the modulation phase signal further converted into that of a RF band is power amplified by the variable gain device 9, and synthesized with the modulation amplitude signal and then output as a modulated wave.

In this embodiment, it is enough to prepare only one phase modulation system D/A converter, as a D/A conversion is implemented after frequency conversion into the IF signal. Moreover, as modulation processing is implemented before the D/A conversion, the modulation processing can be implemented with still higher accuracy.

The present invention is not limited to the aforementioned embodiment but also, it can be practiced in different variation without departing from its technical scope.

Industrial Applicability

As described hereinbefore, in the present invention, the phase signal and amplitude signal are extracted from the modulating signal in the phase signal/amplitude signal generation unit 1, the frequency conversion is implemented by the phase modulation in the phase signal, and then power of the radio frequency signal is controlled by the amplitude signal in the amplifier. Therefore, modulated signal with little out of band undesired component 1 can be obtained, even if the modulating signal contains amplitude variation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A modulation circuit for obtaining a modulated signal, by modulating a carrier signal using a modulating signal, comprising:
    means for extracting a phase signal and an amplitude signal from the modulating signal;
    means for converting the phase signal into an analog signal;
    first means for generating a first oscillation frequency signal;
    means for modulating, using quadrature modulation, the analog signal output from the converting means to an IF signal, based on the first oscillation frequency signal;
    second means for generating a second oscillation frequency signal,
    means for converting the frequency of the IF signal output from the modulating means and converting the IF signal into a RF signal, based on the second oscillation frequency signal;
    means for delaying the amplitude signal output from the extracting means for a time; and
    means for varying the amplitude of the RF signal and amplifying the varied RF signal in accordance with the delayed amplitude signal output from the delaying means, and for outputting the amplified RF signal,
    wherein the delay means comprises:
        means for setting the time; and
        a delay circuit for delaying the amplitude signal output from the extracting means in accordance with the time set by setting means,
        the setting means including a circuit for setting the time, based on at least one of a modulation type, a modulation index, a frequency, a roll off rate of the modulating signal, an ambient temperature, a supply voltage to the modulation circuit, and a gain.

2. The modulation circuit according to claim 1, further comprising a power amplifying circuit for calculating a mean valve of power values each of which corresponds to an output signal output from the modulation circuit and amplifying the amplified RF signal output from the varying means based on the mean value.

3. The modulation circuit according to claim 1, further comprising means for correcting the delayed amplitude signal output from the delaying means to correct the linearity of controlling gain variation in the varying means using an equation or a conversion table.

4. A modulation circuit for obtaining a modulated signal, by modulating a carrier signal using a modulating signal, comprising:
    means for extracting a phase signal and an amplitude signal from the modulating signal;
    means for digitally modulating, using quadrature modulation, the phase signal output from the extracting means to an IF signal;
    means for converting the IF signal output from the modulating means into an analog IF signal;
    means for converting the frequency of the analog IF signal output from the converting means and converting the analog IF signal into a RF signal;
    means for delaying the amplitude signal output from the extracting means for a time; and
    means for varying the amplitude of the RF signal and amplifying the varied RF signal in accordance with the delayed amplitude signal output from the delaying means, and for outputting the amplified RF signal,
    wherein the delaying means comprises:
        means for setting the time; and
        a delay circuit for delaying the amplitude signal output from the extracting means in accordance with the time set by the setting means,
        the setting means including a circuit for setting the time, based on at least one of a modulation type, a modulation index, a frequency, a roll off rate of the modulating signal, an ambient temperature, a supply voltage to the modulation circuit, and a gain.

5. The modulation circuit according to claim 1, wherein the frequency converting means includes:
   a first filter to limit the frequency band of the IF signal;
   a first counting-down circuit to divide the frequency of the IF signal;
   a multiplier to multiply the second oscillation frequency signal and the RF signal;
   a second filter to limit the frequency band of an output signal from the multiplier;
   a second counting-down circuit to divide the frequency of the output signal;
   a phase difference detector to detect the phase difference between output signals from the first and second counting-down circuits; and
   a third filter to smooth a signal corresponding to the detected phase difference;
   wherein the first, second, and third filters, the first and second counting-down circuits, the multiplier, and the phase difference detector are comprised in a phase-synchronizing modulation loop.

6. The modulation circuit according to claim 1, wherein the frequency converting means includes:
   a first filter to limit the frequency band of the IF signal;
   a multiplier to multiply the output signal from the first filter and the second oscillation frequency signal; and
   a second filter to limit the frequency band of an output signal output from the multiplier.

7. A cellular phone comprising the modulation circuit according to claim 1.

8. A method for obtaining a modulated signal, by modulating a carrier signal using a modulating signal, comprising:
   extracting a phase signal and an amplitude signal from the modulating signal;
   converting the phase signal into an analog signal;
   first generating a first oscillation frequency signal;
   modulating, using quadrature modulation, the analog signal output from the converting to an IF signal, based on the first oscillation frequency signal;
   second generating a second oscillation frequency signal;
   converting the frequency of the IF signal output in the modulating and converting the IF signal line a RF signal, based on the second oscillation frequency signal;
   delaying the amplitude signal output in the extracting for a time; and
   varying the amplitude of the RF signal and amplifying the varied RF signal in accordance with the delayed amplitude signal output in the delaying, and outputting the amplified RF signal,
   wherein the delaying comprises:
      setting the time; and
      delaying the amplitude signal output in the extracting in accordance with the set time,
      wherein the setting includes setting the time, based on at least one of a modulation type, modulation index, a frequency, a roll off rate of the modulating signal, an ambient temperature, a supply voltage to the modulation circuit, and a gain.

9. The method according to claim 8, further comprising:
   calculating a mean value of power values each of which corresponds to an output signal due to the method; and
   amplifying the amplified RF signal output in the amplifying based on the mean value.

10. The method according to claim 8, further comprising correcting the delayed amplitude signal output in the delaying to correct the linearity of controlling gain variation in the amplifying using an equation or a conversion table.

11. A method for obtaining a modulated signal, by modulating a carrier signal using a modulating signal, comprising:
    extracting a phase signal and an amplitude signal from the modulating signal;
    digitally modulating, using quadrature modulation, the phase signal to an IF signal;
    converting the IF signal into an analog IF signal;
    converting the frequency of the analog IF signal and converting the analog IF signal into a RF signal;
    delaying the amplitude signal for a time; and
    varying the amplitude of the RF signal and amplifying the varied RF signal in accordance with the delayed amplitude signal output in the delaying, and outputting the amplified RF signal,
    wherein the delaying comprises:
       setting the time; and
       delaying the amplitude signal output in the extracting in accordance with the set time,
       the setting including setting the time, based on at least one of a modulation type, a modulation index, a frequency, a roll off rate of the modulating signal, an ambient temperature, a supply voltage to the modulation circuit, and a gain.

12. The method according to claim 8, wherein the frequency converting step includes:
    first limiting the frequency band of the IF signal;
    first dividing the frequency of the IF signal;
    multiplying the second oscillation frequency signal and the RF signal;
    second limiting the frequency band of an output signal output in the multiplying;
    second dividing the frequency of the output signal;
    detecting the phase difference between output signals from the first and second dividing; and
    smoothing a signal corresponding to the detected phase difference;
    wherein the first and second limiting, the first and second dividing, the multiplying, the detecting, and the smoothing are comprised in a phase-synchronizing modulation loop.

13. The method according to claim 8, wherein the frequency converting includes:
    first limiting the frequency band of the IF signal;
    multiplying the output signal from the first limiting step and the second oscillation frequency signal; and
    second limiting the frequency band of an output signal output in the multiplying.

14. The modulation circuit according to claim 2, wherein the delayed amplitude signal output from the delaying means and an output gain signal designating the output electric power average value to be transmitted being synthesized as a synthesized signal, the synthesized signal is input to the power amplifying circuit.

15. A modulation circuit for obtaining a modulated signal, by modulating a carrier signal using a modulating signal, comprising:
    means for extracting a phase signal and an amplitude signal from the modulating signal;
    means for converting the phase signal into an analog signal;

first means for generating a first oscillation frequency signal;

means for modulating, using quadrature modulation, the analog signal output from the converting means to an IF signal, based on the first oscillation frequency signal;

second means for generating a second oscillation frequency signal, means for converting the frequency of the IF signal output from the modulating means and converting the IF signal into a RF signal, based on the second oscillation frequency signal;

means for delaying the amplitude signal output from the extracting means for a time; and means for varying the amplitude of the RF signal and amplifying the varied RF signal in accordance with the delayed amplitude signal output from the delaying means, and for outputting the amplified RF signal;

wherein the delaying means comprises:

means for setting the time; and a delay circuit for delaying the amplitude signal output from the extracting means in accordance with the time set in the setting means, the setting means including a circuit for setting the time, based on at least one of a modulation type, a modulation index, a frequency, a roll off rate of the modulating signal an ambient temperature, a supply voltage to the modulation circuit, and gain.

16. The modulation circuit according to claim 3, wherein the correcting means corrects to obtain the linearity of relationship between the output power of the outputting means and the modulating signal.

17. A modulation circuit for obtaining a modulated signal, by modulating a carrier signal using a modulating signal, comprising:

means for extracting a phase signal and an amplitude signal from the modulating signal;

means for converting the phase signal into an analog signal;

first means for generating a first oscillation frequency signal;

means for modulating, using quadrature modulation, the analog signal output from the converting means to an IF signal, based on the first oscillation frequency signal;

second means for generating a second oscillation frequency signal, means for converting the frequency of the IF signal output from the modulating means and converting the IF signal into a RF signal, based on the second oscillation frequency signal;

means for delaying the amplitude signal output from the extracting means for a time; and means for varying the amplitude of the RF signal and amplifying the varied RF signal in accordance with the delayed amplitude signal output from the delaying means, and for outputting the amplified RF signal;

wherein the frequency converting means includes a loop for converting the frequency of the IF signal output from the modulating means, based on the IF signal and the RF signal, wherein the delaying means comprises:

means for setting the time; and a delay circuit for delaying the amplitude signal output from the extracting means in accordance with the time set by the setting means.

the setting means including a circuit for setting the time, based on at least one of a modulation type, a modulation index, a frequency, a roll off rate of the modulating signal, an ambient temperature, a supply voltage to the modulation circuit, and a gain.

18. The modulation circuit according to claim 1, wherein the frequency converting means includes:

a first filter to limit the frequency band of the IF signal;

a multiplier to multiply the second oscillation frequency signal and the RF signal;

a second filter to limit the frequency band of an output signal from the multiplier;

a phase difference detector to detect the phase difference between output signals from the first and second filter;

a third filter to smooth a signal corresponding to the detected phase difference; wherein the first, second, and third filters, the multiplier, and the phase difference detector are comprised in a phase-synchronizing modulation loop.

19. The method according to claim 9, wherein the delayed amplitude signal output in the delaying and an output gain signal designating the output electric power average value to be transmitted being synthesized as a synthesized signal, the output signal is output based on the synthesized signal.

20. A method for obtaining a modulated signal, by modulating a carrier signal using a modulating signal, comprising:

extracting a phase signal and an amplitude signal from the modulating signal;

converting the phase signal into an analog signal;

first generating a first oscillation frequency signal;

modulating, using quadrature modulation, the analog signal to an IF signal, based on the first oscillation frequency signal;

second generating a second oscillation frequency signal;

converting the frequency of the IF signal output in the modulating step and converting the IF signal into a RF signal, based on the second oscillation frequency signal;

delaying the amplitude signal output in the extracting step for a time; and varying the amplitude of the RF signal and amplifying the varied RF signal in accordance with the delayed amplitude signal output in the delaying step;

wherein the delaying step comprises:

setting the time; and delaying the amplitude signal output in the extracting step in accordance with the time set in the setting step, the setting including the time, based on at least one of a modulation type, a modulation index, a frequency, a roll off rate of the modulating signal, an ambient temperature, a supply voltage to the modulation circuit and a gain.

21. The method according to claim 10, wherein the correcting corrects to obtain the linearity of relationship between the output power of the outputting and the modulating signal.

22. A method for obtaining a modulated signal, by modulating a carrier signal using a modulating signal, comprising:

extracting a phase signal and an amplitude signal from the modulating signal;

converting the phase signal into an analog signal;

first generating a first oscillation frequency signal;

modulating, using quadrature modulation, the analog signal to an IF signal, based on the first oscillation frequency signal;

second generating a second oscillation frequency signal;
converting the frequency of the IF signal output in the modulating and converting the IF signal into a RF signal, based on the second oscillation frequency signal;
delaying the amplitude signal output in the extracting for a time; and
varying the amplitude of the RF signal and amplifying the varied RF signal in accordance with the delayed amplitude signal output in the delaying;
wherein the frequency converting includes a phase-synchronizing modulation loop for converting the frequency of the IF signal output in the modulating, based on the IF signal and the RF signal,
wherein the delaying comprises:
  setting the time; and
  delaying the amplitude signal output in the extracting in accordance with the set time.
  the setting including setting the time, based an at least one of a modulation type, a modulation index, a frequency, a roll off rate of the modulating signal, an ambient temperature, a supply voltage to the modulation circuit, and a gain.

23. The method according to claim 8, wherein the frequency converting includes:
first limiting a frequency band of the IF signal output in the modulating;
multiplying the second oscillation frequency signal and the RF signal;
second limiting a frequency band of an output signal from the multiplying;
detecting the phase difference between output signals from the first and second limiting;
smoothing a signal corresponding to the phase difference;
wherein the first and second limiting, the multiplying, the detecting, and the smoothing are comprised in a phase-synchronizing modulation loop step.

* * * * *

UNITED STATES PATENT AND TRADEMARK OFFICE
CERTIFICATE OF CORRECTION

PATENT NO. : 6,914,943 B2
DATED : July 5, 2005
INVENTOR(S) : Shimizu

It is certified that error appears in the above-identified patent and that said Letters Patent is hereby corrected as shown below:

Column 16,
Line 29, change "mean valve" to -- mean value --.

Column 17,
Line 44, change "signal line" to -- signal into --.

Column 18,
Line 50, after "the first limiting", delete "step".

Column 19,
Line 27, change "signal" to -- signal, --.
Line 67, change "means." to -- means, --.

Column 20,
Line 50, change "including the time," to -- including setting the time, --.
Line 53, change "circuit" to -- circuit, --.

Column 21,
Line 19, change "time." to -- time, --.
Line 20, change "an at least" to -- on at least --.

Column 22,
Line 19, change "loop step." to -- loop. --.

Signed and Sealed this

Thirtieth Day of August, 2005

JON W. DUDAS
*Director of the United States Patent and Trademark Office*